US010461976B2

(12) United States Patent
Chen et al.

(10) Patent No.: US 10,461,976 B2
(45) Date of Patent: Oct. 29, 2019

(54) CYCLIC PREFIX MANAGEMENT IN NEW RADIO

(71) Applicant: QUALCOMM Incorporated, San Diego, CA (US)

(72) Inventors: Wanshi Chen, San Diego, CA (US); Jing Jiang, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/808,439

(22) Filed: Nov. 9, 2017

(65) Prior Publication Data
US 2018/0139082 A1    May 17, 2018

Related U.S. Application Data

(60) Provisional application No. 62/421,212, filed on Nov. 11, 2016.

(51) Int. Cl.
*H04L 27/26* (2006.01)
*H04L 5/00* (2006.01)

(52) U.S. Cl.
CPC ........ *H04L 27/2607* (2013.01); *H04L 5/0007* (2013.01); *H04L 5/0051* (2013.01); *H04L 27/2646* (2013.01); *H04L 5/0048* (2013.01)

(58) Field of Classification Search
None
See application file for complete search history.

(56) References Cited

U.S. PATENT DOCUMENTS

2013/0022090 A1*  1/2013  Weng ............... H04L 25/03343
                                                        375/219
2013/0163501 A1*  6/2013  Chen .................. H04L 27/2607
                                                        370/312

(Continued)

FOREIGN PATENT DOCUMENTS

WO    WO-2010050731 A2    5/2010
WO       2014112907 A1    7/2014

(Continued)

OTHER PUBLICATIONS

International Search Report and Written Opinion—PCT/US2017/060989—ISA/EPO—dated Feb. 15, 2018.

(Continued)

*Primary Examiner* — Yemane Mesfin
*Assistant Examiner* — Jeff Banthrongsack
(74) *Attorney, Agent, or Firm* — Loza & Loza, LLP

(57) ABSTRACT

Aspects of the disclosure relate to wireless communication systems configured to provide techniques for managing the cyclic prefix (CP) type of a transmission as a function of one or more parameters, such as the transmission type (e.g., the type of channel or signal), the resources utilized for the transmission, or the tone spacing of the transmission. In some examples, at least a portion of the downlink and/or uplink control channels or signals utilize a CP having one duration, while other control channels or signals and/or traffic channels may utilize either the same CP or a different CP having a different duration. The CP type or duration for a given transmission may be indicated in various manners.

30 Claims, 14 Drawing Sheets

(56) References Cited

U.S. PATENT DOCUMENTS

| | | | |
|---|---|---|---|
| 2013/0250818 A1* | 9/2013 | Gaal | H04W 56/00 370/277 |
| 2015/0131749 A1 | 5/2015 | Slomina et al. | |
| 2015/0358801 A1 | 12/2015 | Seo et al. | |
| 2016/0105863 A1 | 4/2016 | Li et al. | |
| 2017/0180095 A1 | 6/2017 | Xue et al. | |

FOREIGN PATENT DOCUMENTS

| | | | | |
|---|---|---|---|---|
| WO | WO-2014112907 A1 * | 7/2014 | | H04L 1/0006 |
| WO | 2017196684 A1 | 11/2017 | | |

OTHER PUBLICATIONS

Sharp: "Consideration on Configurable CP Length for D2D Transmission", 3GPP Draft; R1-142202, 3rd Generation Partnership Project (3GPP), Mobile Competence Centre, 650, Route Des Lucioles, F-06921 Sophia-Antipolis Cedex, France, vol. RAN WG1, No. Seoul, Korea; May 18, 2014, XP050787798, Retrieved from the Internet: URL:http://www.3gpp.org/ftp/Meetings_3GPP_SYNC/RAN1/Docs/ [retrieved on May 18, 2014], 5 pages.

* cited by examiner

CYCLIC PREFIX MANAGEMENT IN NEW RADIO

PRIORITY CLAIM

This application claims priority to and the benefit of Provisional Patent Application No. 62/421,212 filed in the U.S. Patent and Trademark Office on Nov. 11, 2016, the entire content of which is incorporated herein by reference as if fully set forth below in its entirety and for all applicable purposes.

TECHNICAL FIELD

The technology discussed below relates generally to wireless communication systems, and more particularly, to management of the cyclic prefix (CP) type in wireless communication systems.

INTRODUCTION

Fourth-generation (4G) wireless communication networks that follow standards for an evolved UMTS Terrestrial Radio Access Network (eUTRAN, also commonly known as LTE) utilize an Orthogonal Frequency Division Multiplexing (OFDM) waveform on the downlink. An OFDM waveform transmitted by a transmitter to a receiver may experience a multi-path delay spread produced from a set of different paths between the transmitter and the receiver when those paths have different delays. For example, an initial component of an OFDM waveform following a direct line-of-sight path may arrive at the receiver before a different component of the same OFDM waveform that has been reflected one or more times is received. In such a multipath environment, OFDM waveforms may be susceptible to inter-symbol interference (ISI), in which one OFDM symbol interferes with subsequent OFDM symbols due to the multipath propagation of the OFDM waveform.

To minimize the ISI resulting from multi-path delay spread, a cyclic prefix (CP) may be appended to the beginning of each OFDM symbol. The CP operates as a guard period between OFDM symbols and may be generated by copying a small part of the end of an OFDM symbol to the beginning of the OFDM symbol. Thus, the receiver may more accurately identify the end of each OFDM symbol and correctly correlate the multipath components, thereby reducing the ISI.

In general, the duration of the cyclic prefix should be greater than the duration of the multi-path delay spread. In LTE, two CP lengths are defined: a normal CP length and an extended CP length. The normal CP has a duration of 4.7 µs, and the extended CP has a duration of 16.67 µs. The normal CP may be sufficient in urban environments, where the multiple components arrive from relatively shorter distances, while the extended CP may be required in rural locations where components may arrive from larger distances. CP management may be cell-specific. That is, the CP type (normal or extended) is defined for each cell and indicated via control signaling within the cell.

Next generation (e.g., 5G or New Radio) wireless communication networks may require lower overhead for control information, higher reliability, lower latency and higher peak data rates. Efficient techniques for managing the CP within a cell may enable wireless communication networks to meet one or more of these stringent requirements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide techniques for managing the cyclic prefix (CP) type of a transmission as a function of one or more parameters, such as the transmission type (e.g., the type of channel or signal), the resources utilized for the transmission, or the tone spacing of the transmission. In some examples, at least a portion of the downlink and/or uplink control channels or signals utilize a CP having one duration, while other control channels or signals and/or traffic channels may utilize either the same CP or a different CP having a different duration. The CP type or duration for a given transmission may be pre-configured or indicated in various manners.

In one aspect of the disclosure, a method of wireless communication is provided. The method includes detecting a cell from a first transmission utilizing a first cyclic prefix, receiving cyclic prefix information related to a second cyclic prefix, and selecting a cyclic prefix type for a second transmission in the cell based on the cyclic prefix information and at least one of a resource location, a tone spacing, or a transmission type of the second transmission. The transmission type may include a channel type or a signal type of the second transmission, and the cyclic prefix type may include the first cyclic prefix or the second cyclic prefix. The method further includes communicating with the cell utilizing the cyclic prefix type for the second transmission, where each of the first transmission and the second transmission includes one or more channels or signals.

Another aspect of the disclosure provides a scheduled entity in a wireless communication network. The scheduled entity includes a transceiver, a memory, and a processor communicatively coupled to the transceiver and the memory. The processor is configured to detect a cell from a first transmission utilizing a first cyclic prefix and receive cyclic prefix information related to a second cyclic prefix. The processor is further configured to select a cyclic prefix type for a second transmission in the cell based on the cyclic prefix information and at least one of a resource location, a tone spacing, or a transmission type of the second transmission, where the transmission type includes a channel type or a signal type of the second transmission, and the cyclic prefix type includes the first cyclic prefix or the second cyclic prefix. The processor is further configured to communicate with the cell utilizing the cyclic prefix type for the second transmission, where each of the first transmission and the second transmission includes one or more channels or signals.

Another aspect of the disclosure provides a scheduled entity apparatus within a wireless communication network includes means for detecting a cell from a first transmission utilizing a first cyclic prefix and means for receiving cyclic prefix information related to a second cyclic prefix. The scheduled entity apparatus further includes means for selecting a cyclic prefix type for a second transmission in the cell based on the cyclic prefix information and at least one of a resource location, a tone spacing, or a transmission type of the second transmission, where the transmission type includes a channel type or signal type of the second transmission and the cyclic prefix type includes the first cyclic prefix or the second cyclic prefix. The scheduled entity apparatus further includes means for communicating with the cell utilizing the cyclic prefix type for the second transmission, where each of the first transmission and the second transmission includes one or more channels or signals.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
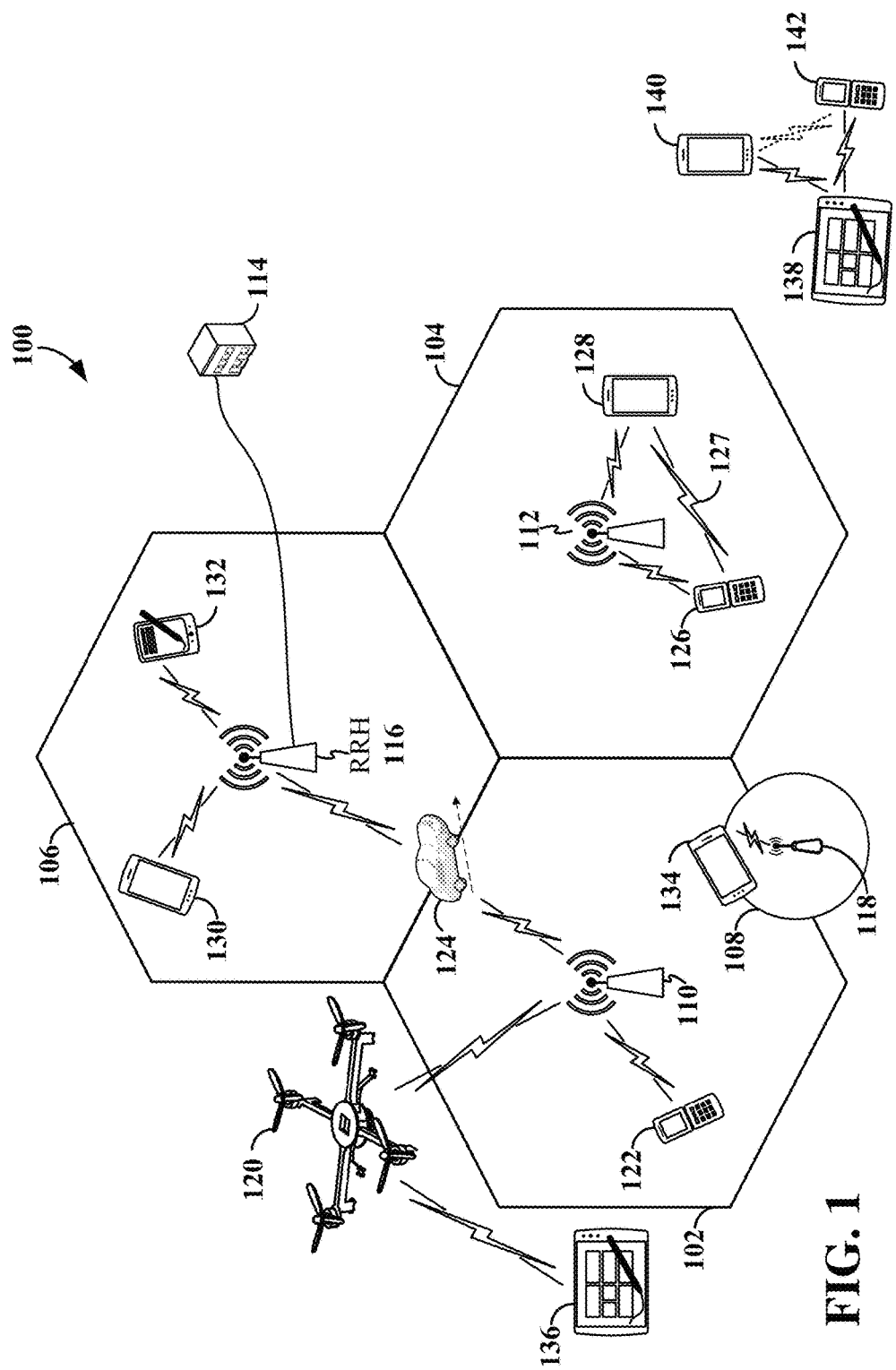
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. In some examples, the radio access network 100 may be a network employing continued evolved wireless communication technologies. This may include, for example, a fifth generation (5G) or New Radio (NR) wireless communication technology based on a set of standards. For example, standards may be defined by the 3GPP following LTE-Advanced or by the 3GPP2 following CDMA2000 may be considered 5G. Standards may also include pre-3GPP efforts specified by Verizon Technical Forum and Korea Telecom SIG.

In other examples, the radio access network 100 may be a network employing a third generation (3G) wireless communication technology or a fourth generation (4G) wireless communication technology. For example, standards promulgated by the 3rd Generation Partnership Project (3GPP) and the 3rd Generation Partnership Project 2 (3GPP2) may be considered 3G or 4G, including but not limited to, Long-Term Evolution (LTE), LTE-Advanced, Evolved Packet System (EPS), and Universal Mobile Telecommunication System (UMTS). Additional examples of various radio access technologies based on one one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), discrete Fourier transform spread orthogonal frequency division multiple access (DFT-s-OFDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), discrete Fourier transform spread orthogonal frequency division multiplexing (DFT-s-OFDM) or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
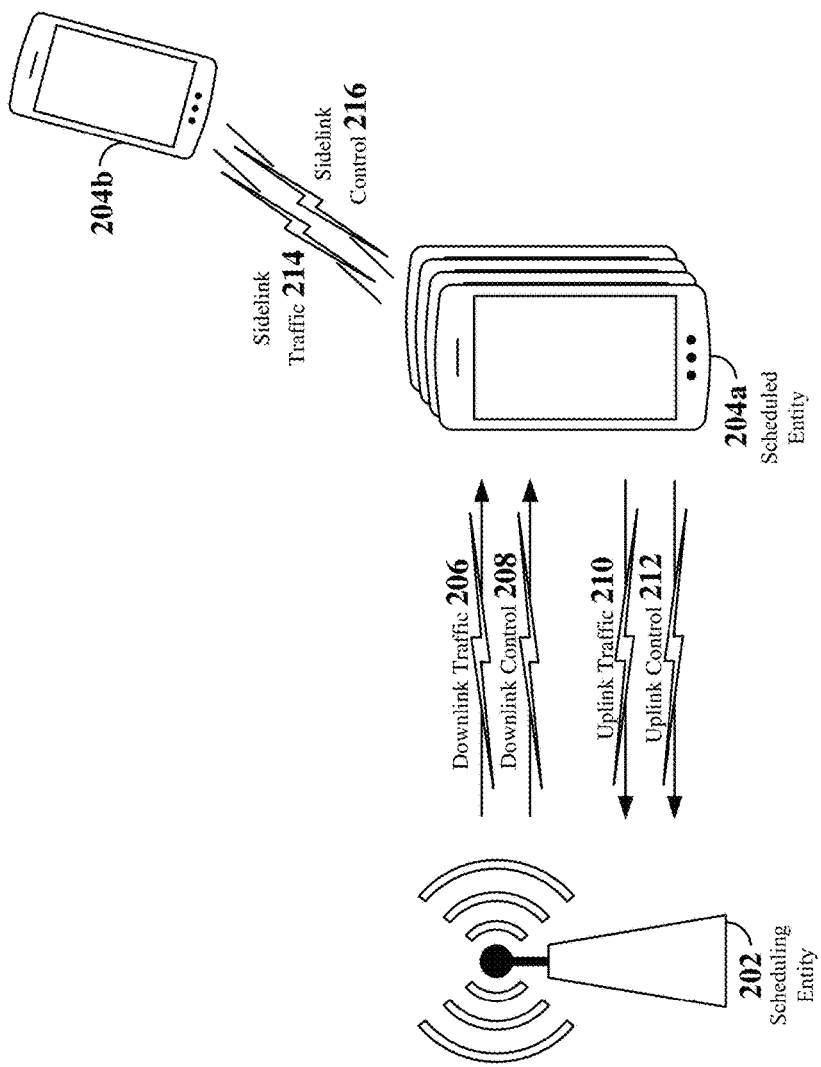
FIG. 2 is a block diagram conceptually illustrating an example of a scheduling entity communicating with one or more scheduled entities.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
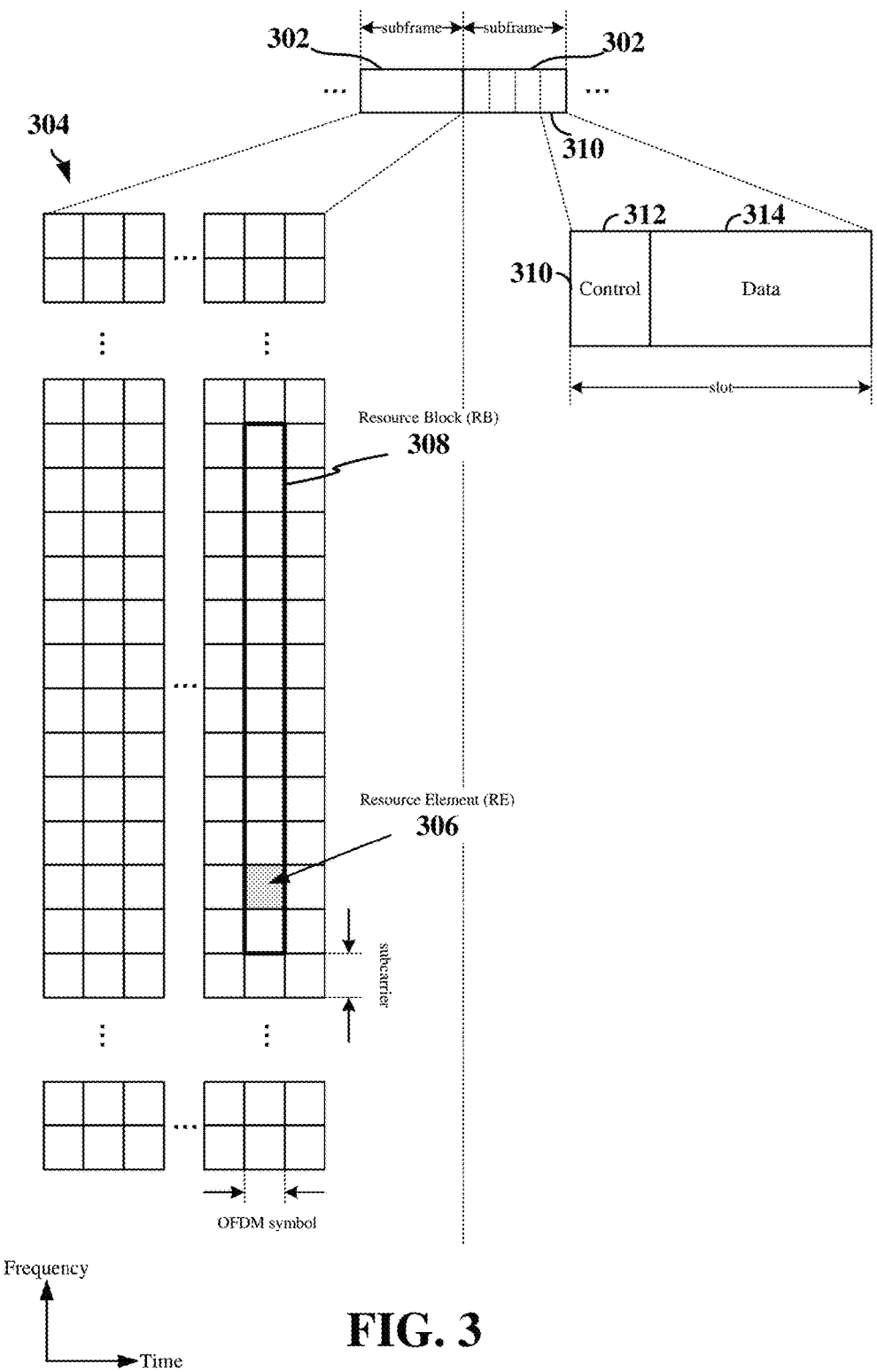
FIG. 3 is a schematic diagram illustrating organization of wireless resources in an air interface utilizing orthogonal frequency divisional multiplexing (OFDM).

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a normal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 202) may allocate one or more REs 306 (e.g., within a control region 312) to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 204) may utilize one or more REs 306 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
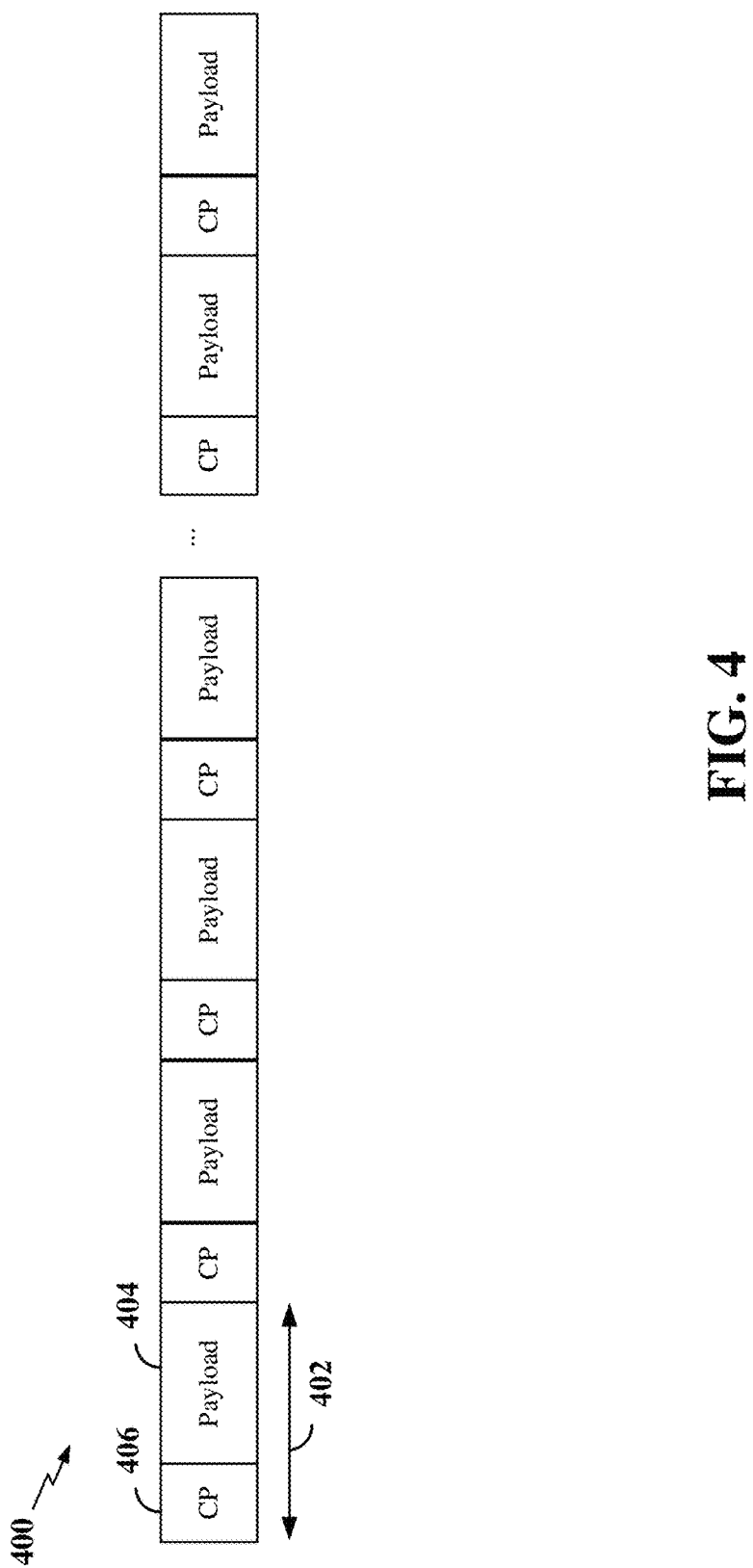
FIG. 4 is a diagram illustrating an example of a transmission including OFDM symbols with cyclic prefixes (CPs) according to some aspects of the disclosure.

FIG. 4 is a diagram illustrating an example of a transmission 400 according to some aspects of the disclosure. In some examples, the transmission 400 may correspond to a DL or UL slot 310, as shown in FIG. 3. The transmission 400 may include a plurality of OFDM symbols 402, each including a payload 404 and a cyclic prefix (CP) 406 appended to the beginning thereof. The CP 406 operates as a guard period between OFDM symbols 402 and may be generated by copying a small part of the end of the payload 404 of an OFDM symbol 402 to the beginning of the OFDM symbol 402. In some examples, the CP 406 may have either a normal CP length or an extended CP length. As an example, the normal CP may have a duration of 4.7 µs, and the extended CP may have a duration of 16.67 µs for a 15 kHz tone spacing. It should be noted that the actual CP lengths for the normal CP and the extended CP may depend on the tone spacing, the time slot duration and other factors. In addition, more than two different CP lengths or durations may be utilized.

In various aspects of the disclosure, a particular CP (e.g., either the normal or extended CP or other CP type) may be selected for one or more UL and/or DL transmissions (e.g., one or more UL and/or DL channels and/or signals). Thus, the CP type (e.g., normal or extended) may be decoupled from the cell and instead tied to the types of transmissions occurring in the cell. In some examples, at least a portion of the UL and/or DL control channels or signals may utilize a CP having one duration, while other control channels or signals and/or traffic channels may utilize either the same CP or a different CP having a different duration. For example, the normal CP may be utilized within initial access signals and/or channels (e.g., PSS/SSS/PBCH) to enable a scheduled entity to detect a cell (e.g., scheduling entity). The scheduled entity may then be pre-configured with either the normal CP or the extended CP for other UL and/or DL transmissions or may receive an indication from the scheduling entity of a CP type (e.g., either the normal or extended CP) to utilize for other UL and/or DL transmissions.

For example, the scheduled entity may receive cyclic prefix information from the scheduling entity including the cyclic prefix type or duration for one or more UL and/or DL transmissions. The cyclic prefix information may include one or more bits indicating the respective CP type for each of the UL and/or DL transmissions. The cyclic prefix information may alternatively include an indication of whether the scheduling entity supports the extended CP to enable the scheduled entity to utilize a supported CP type for a particular UL and/or DL transmission. The scheduled entity may select a CP type for a particular UL and/or DL transmission based on not only the cyclic prefix information, but also various transmission information, such as the location of resource elements to be utilized for the transmission, the numerology (e.g., tone (subcarrier) spacing) of the transmission, the type of transmission (e.g., control, traffic, etc.), and link direction (e.g., UL, DL, or sidelink).

Figure 5:
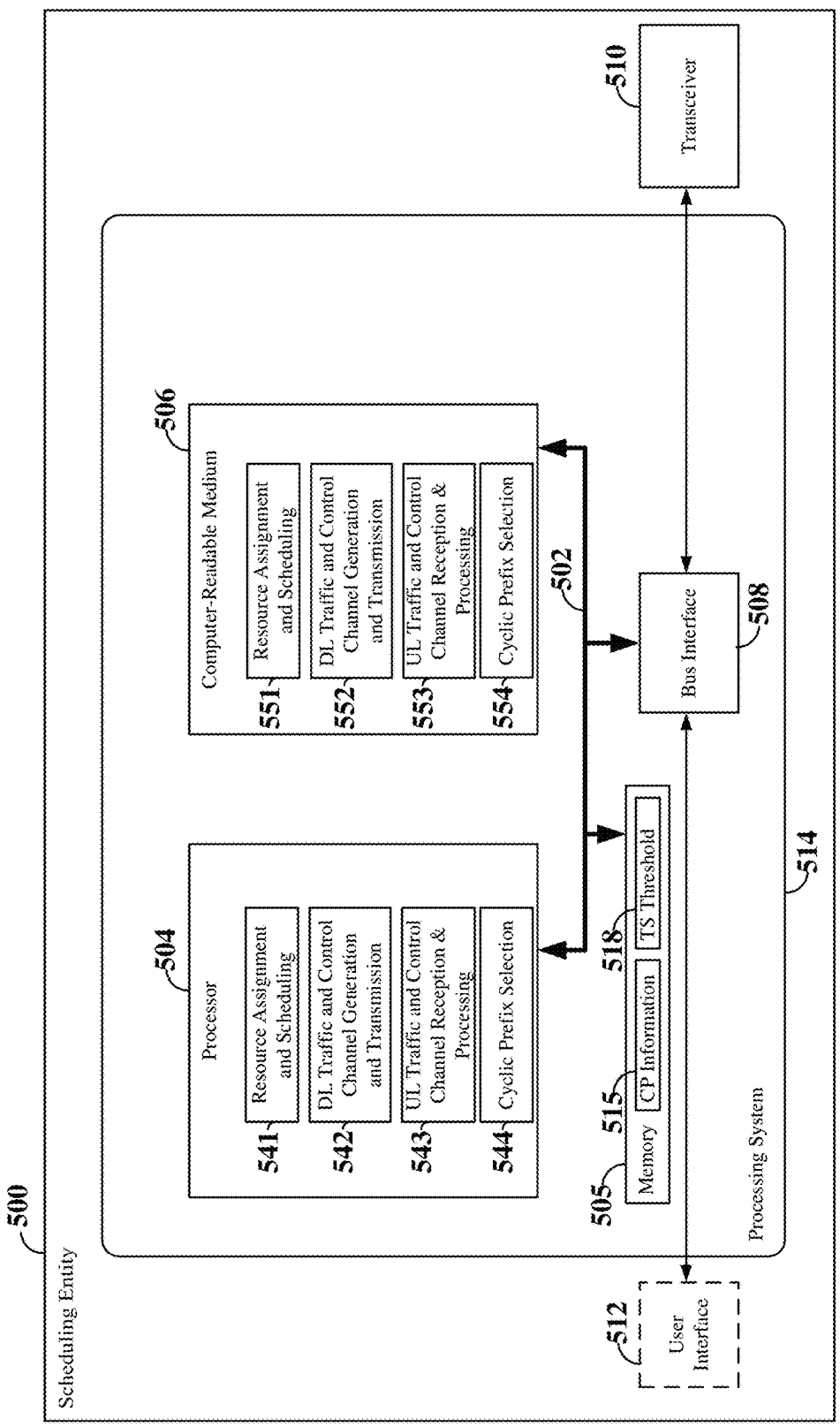
FIG. 5 is a block diagram illustrating an example of a hardware implementation for a scheduling entity employing a processing system according to some aspects of the disclosure.

FIG. 5 is a simplified block diagram illustrating an example of a hardware implementation for a scheduling entity 500 employing a processing system 514. For example, the scheduling entity 500 may be a base station as illustrated in FIGS. 1 and/or 2. In another example, the scheduling entity 500 may be a user equipment as illustrated in FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes described below.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, an optional user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include resource assignment and scheduling circuitry 541, configured to generate, schedule, and modify a resource assignment or grant of time-frequency resources (e.g., a set of one or more resource elements). For example, the resource assignment and scheduling circuitry 541 may schedule time-frequency resources within a plurality of time division duplex (TDD) and/or frequency division duplex (FDD) slots/subframes to carry user data traffic and/or control information to and/or from multiple UEs (scheduled entities). The resource assignment and scheduling circuitry 541 may further operate in coordination with resource assignment and scheduling software 451.

The processor 504 may further include downlink (DL) traffic and control channel generation and transmission circuitry 542, configured to generate and transmit downlink user data traffic and control signals/channels. For example, the DL traffic and control channel generation and transmission circuitry 542 may be configured to generate master information blocks (MIBs), master or other system information blocks (SIBs), and/or radio resource control (RRC) connection or configuration messages, and various channels, such as the PBCH (which may carry the MIB and/or SIB), PSS, SSS, physical control format indicator channel (PCFICH), physical hybrid automatic repeat request (HARQ)

indicator channel (PHICH), and/or physical downlink control channel (PDCCH) including downlink control information (DCI). In some examples, the DCI may include control information indicating an assignment of downlink resources for downlink data or a grant of uplink or sidelink resources for one or more scheduled entities.

The DL traffic and control channel generation and transmission circuitry 542 may further be configured to generate a physical downlink shared channel (PDSCH) including downlink user data traffic. In addition, the DL traffic and control channel generation and transmission circuitry 542 may operate in coordination with the resource assignment and scheduling circuitry 541 to schedule the DL user data traffic and/or control information and to place the DL user data traffic and/or control information onto a time division duplex (TDD) or frequency division duplex (FDD) carrier within one or more slots/subframes in accordance with the resources assigned to the DL user data traffic and/or control information. The DL traffic and control channel generation and transmission circuitry 542 may further be configured to multiplex DL transmissions utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In various aspects of the disclosure, the DL traffic and control channel generation and transmission circuitry 542 may further be configured to utilize OFDM or other suitable multiplexing scheme and append a cyclic prefix (CP) to each OFDM symbol generated for a particular transmission (e.g., for one or more DL channels or signals). For example, the DL traffic and control channel generation and transmission circuitry 542 may be configured to copy a small part of the end of an OFDM symbol to the beginning of the OFDM symbol. In some examples, the CP may be either a normal CP having a duration of 4.7 µs or an extended CP having a duration of 16.67 µs. The actual CP lengths for the normal CP and the extended CP may depend on the tone spacing, the time slot duration and other factors. In addition, more than two different CP lengths or durations may also be utilized. The DL traffic and control channel generation and transmission circuitry 542 may further operate in coordination with DL data and control channel generation and transmission software 552.

The processor 504 may further include uplink (UL) traffic and control channel reception and processing circuitry 543, configured to receive and process uplink control channels and uplink traffic channels from one or more scheduled entities. For example, the UL traffic and control channel reception and processing circuitry 543 may be configured to receive a scheduling request from a scheduled entity. The UL traffic and control channel reception and processing circuitry 543 may further be configured to provide the scheduling request to the resource assignment and scheduling circuitry 541 for processing. The UL traffic and control channel reception and processing circuitry 543 may further be configured to receive uplink user data traffic from one or more scheduled entities. In general, the UL traffic and control channel reception and processing circuitry 543 may operate in coordination with the resource assignment and scheduling circuitry 541 to schedule UL traffic transmissions, DL traffic transmissions and/or DL traffic retransmissions in accordance with the received UL control information. The UL traffic and control channel reception and processing circuitry 543 may further be configured to process each UL transmission (e.g., UL channel and/or signal) based on a CP type (e.g., normal CP, extended CP, or other CP type) utilized for that transmission. The UL traffic and control channel reception and processing circuitry 543 may further operate in coordination with UL traffic and control channel reception and processing software 553.

The processor 504 may further include cyclic prefix (CP) selection circuitry 544, configured to select a CP type (e.g., normal, extended, or other) for one or more UL and/or DL transmissions (e.g., one or more channels or signals). For a DL transmission, the CP selection circuitry 544 may further be configured to provide the selected CP type to the DL traffic and control channel generation and transmission circuitry 542 to generate and transmit the DL transmission. In some examples, the DL traffic and control channel generation and transmission circuitry 542 may further be configured to provide a guard period between any adjacent normal CP transmissions and extended CP transmissions. For an UL transmission, the CP selection circuitry 544 may further be configured to provide the selected CP type to the UL traffic and control channel reception and processing circuitry 543 for processing of the UL transmission utilizing the selected CP type.

In some examples, the CP selection circuitry 544 may be configured to select the CP type for an UL or DL transmission based on one or more factors or parameters, including, for example, the type of transmission (e.g., type of signal or channel), location of resource elements utilized for the transmission in a slot or subframe, numerology (e.g., tone spacing) of the transmission, and/or link direction. For example, when considering the transmission type, the CP selection circuitry 544 may select a normal CP for an UL and/or DL broadcast or common control signal or channel. For example, the CP selection circuitry 544 may select the normal CP for initial access (cell-specific) signals/channels, such as the PSS, SSS, and/or PBCH. The CP selection circuitry 544 may further be configured to select either the normal CP or the extended CP for other types of UL and/or DL transmissions, such as unicast control and/or traffic channels. For example, the CP selection circuitry 544 may select the normal CP for the PDCCH, contention-based channels, such as the physical random access channel (PRACH), measurement reference signals (e.g., reference signals used for intra-frequency and inter-frequency measurement), tracking reference signals (e.g., reference signals used for time/frequency tracking), and/or demodulation reference signals. The CP selection circuitry 544 may further select the extended CP for zone-specific signals (e.g., zone PBCH and/or zone measurement reference signals) and traffic channels (e.g., PDSCH and/or PUSCH).

The CP selection circuitry 544 may further select the CP type based on the resource location of the UL and/or DL transmission. Broadly, the CP selection circuitry 544 may select one CP type (e.g., the normal CP type) for transmissions over a first set of frequency resources and the other CP type (e.g., the extended CP type) for transmissions over a second set of frequency resources. In some examples, the CP selection circuitry 544 may select the normal CP for transmissions within a DL control region or UL control region of a slot. The CP selection circuitry 544 may further select either the normal CP or the extended CP for transmissions within a DL traffic region or an UL traffic region. In some examples, the CP selection circuitry 544 may select the normal CP for measurement/tracking references signals and/or demodulation reference signals transmitted in the control region of the slot, and the extended CP for measurement/tracking reference signals and/or demodulation reference signals transmitted in the traffic region of the slot.

In some examples, the CP selection circuitry 544 may select the normal CP for measurement/tracking reference signals for at least some slots/subframes. For example, one slot every 40 ms may utilize the normal CP and a reference tone spacing (e.g., 30 kHz) to facilitate measurement by scheduled entities. In other slots/subframes, either the normal CP or the extended CP may be selected for the measurement/tracking reference signals. Thus, the CP selection circuitry 544 may select the normal CP for a first set of one or more slots and the extended CP for a second set of one or more slots.

The CP selection circuitry 544 may further select the CP type based on the tone spacing utilized in the transmission. For example, the CP selection circuitry 544 may select the extended CP when the tone spacing is less than or equal to a tone spacing threshold 518 and may select the normal CP when the tone spacing is greater than the tone spacing threshold 518. In some examples, the tone spacing threshold may be 30 kHz, such that a tone spacing of 15 kHz or 30 kHz may utilize the normal CP, while a tone spacing of 60 kHz or 120 kHz may utilize the extended CP. The tone spacing threshold 518 may be maintained, for example, in memory 505.

The CP selection circuitry 544 may further select the CP type based on link direction (e.g., DL, UL and/or sidelink), which may further be based on one or more other factors. For example, the CP selection circuitry 544 may select the normal CP for sidelink transmissions and the extended CP for UL/DL transmissions. As another example, the CP selection circuitry 544 may select the normal CP for DL transmissions and sidelink transmissions, and the extended CP for UL transmissions.

In some examples, the CP selection circuitry 544 may operate in coordination with the DL traffic and control channel generation and transmission circuitry 542 to generate cyclic prefix information and transmit cyclic prefix information 515 related to one or more CP types to one or more scheduled entities. The cyclic prefix information 515 may be maintained, for example, in memory 505. In some examples, the cyclic prefix information 515 may indicate whether the scheduling entity supports the normal CP and/or the extended CP. In other examples, the cyclic prefix information 515 may further include a respective selected CP type for one or more DL and/or UL transmissions. For example, the cyclic prefix information 515 may include a single CP type for an UL or DL transmission or may include multiple selected CP types, each for a different DL or UL transmission. The cyclic prefix information 515 may further include the numerology (e.g., tone spacing) to use for one or more UL and/or DL transmissions.

The cyclic prefix information 515 may be transmitted within various signals or channels. In some examples, the cyclic prefix information 515 may be transmitted within one or more of a MIB, SIB, RRC configuration message, or DCI. For example, the DCI may include a single bit or multiple bits indicating the CP type for a DL assignment or UL grant. In some examples, the cyclic prefix information 515 may include a single bit or multiple bits transmitted within a random access response message indicating the CP type for an uplink grant. In some examples, the cyclic prefix information 515 may be transmitted within the PSS and/or SSS and include the CP type and tone spacing for a measurement reference signal. Thus, when a scheduled entity receives the PSS/SSS, the scheduled entity may be able to perform measurements in the cell based on the indicated numerology and CP type.

In some examples, the CP type for one or more designated DL and/or UL transmissions may be pre-configured in the wireless access network, such that the scheduling entity 500 need not transmit the cyclic prefix information including the CP type for the designated DL and/or UL transmissions. For example, the normal CP may be pre-configured in the wireless access network for one or more of the PSS, SSS and/or PBCH. Implementing the same CP type for the PSS, SSS, and/or PBCH throughout the wireless access network ensures that scheduled entities may correctly receive the PSS, SSS and/or PBCH to detect a cell, synchronize with the cell and perform other initial access procedures.

In some examples, the CP selection circuitry 544 may further be configured to receive cyclic prefix information 515 from one or more scheduled entities. The cyclic prefix information 515 received from a particular scheduled entity may indicate whether that scheduled entity supports the normal CP and/or the extended CP and/or whether the scheduled entity is pre-configured with a particular CP type (e.g., normal or extended) for one or more DL and/or UL transmissions. The CP selection circuitry 544 may further utilize the received cyclic prefix information 515 when selecting a CP type for a particular UL and/or DL transmission. The CP selection circuitry 544 may further operate in coordination with CP selection software 554.

Figure 6:
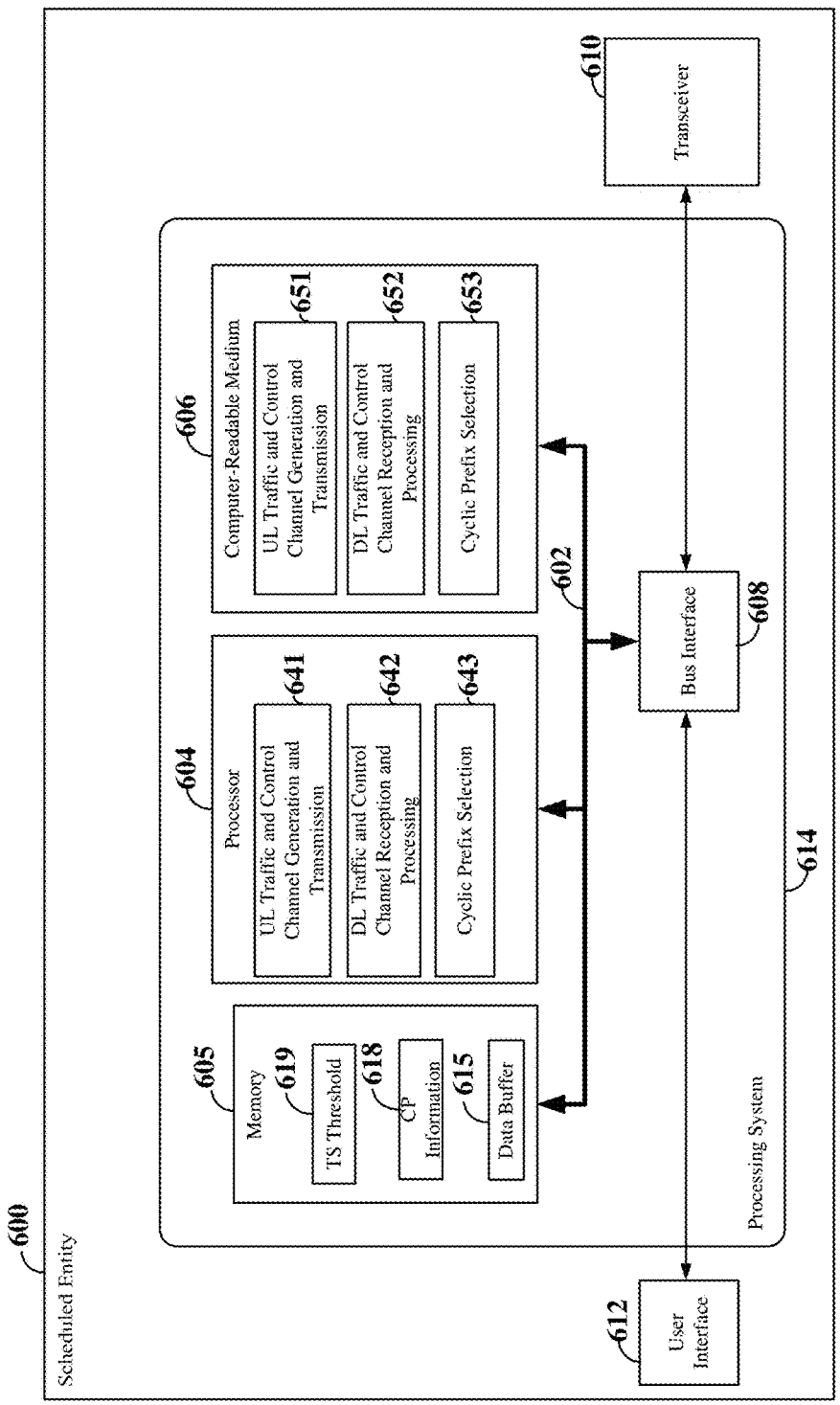
FIG. 6 is a block diagram illustrating an example of a hardware implementation for a scheduled entity employing a processing system according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below.

In some aspects of the disclosure, the processor 604 may include uplink (UL) traffic and control channel generation and transmission circuitry 641, configured to generate and transmit uplink control/feedback/acknowledgement information on an UL control channel. For example, the UL traffic and control channel generation and transmission circuitry 641 may be configured to generate and transmit an uplink control channel (e.g., a Physical Uplink Control Channel (PUCCH)). The UL traffic and control channel generation and transmission circuitry 641 may further be configured to generate and transmit uplink user data traffic on an UL traffic channel (e.g., a PUSCH) in accordance with an uplink grant. The UL traffic and control channel generation and transmission circuitry 641 may further be configured to utilize a CP type (e.g., normal CP, extended CP, or other CP) to generate the UL control information and/or user data traffic. The UL traffic and control channel generation and transmission circuitry 641 may operate in coordination with UL traffic and control channel generation and transmission software 651.

The processor 604 may further include downlink (DL) traffic and control channel reception and processing circuitry 642, configured for receiving and processing downlink user data traffic on a traffic channel, and to receive and process control information on one or more downlink control channels. For example, the DL traffic and control channel reception and processing circuitry 642 may be configured to receive a Physical Downlink Control Channel (PDCCH) and a Physical Downlink Shared Channel (PDSCH) within a current slot. The DL traffic and control channel reception and processing circuitry 642 may further be configured to process each DL transmission (e.g., UL channel and/or signal) based on a CP type (e.g., normal or extended CP) utilized for that transmission. In some examples, received downlink user data traffic and/or control information may be temporarily stored in a data buffer 615 within memory 605. The DL traffic and control channel reception and processing circuitry 642 may operate in coordination with DL traffic and control channel reception and processing software 652.

The processor 604 may further include cyclic prefix (CP) selection circuitry 643, configured to select a cyclic prefix type for an UL and/or DL transmission (e.g., an UL and/or DL signal or channel). The CP selection circuitry 643 may further be configured to provide the CP type for a DL transmission to the DL traffic and control channel reception and processing circuitry 642 to process the DL transmission. The CP selection circuitry 643 may further be configured to provide the CP type for an UL transmission to the UL traffic and control channel generation and transmission circuitry 641 for generation of the UL transmission utilizing the selected CP type.

In some examples, the CP selection circuitry 643 may be pre-configured with a particular CP type (e.g., normal CP) for one or more designated DL and/or UL transmissions. The pre-configured CP type(s) may be stored within cyclic prefix information 618, which may be maintained, for example, in memory 605. For example, the normal CP may be pre-configured in the scheduled entity 600 for one or more of the PSS, SSS and/or PBCH. Pre-configuring the scheduled entity and the scheduling entity with the same CP type for the PSS, SSS, and/or PBCH ensures that scheduled entity may correctly receive the PSS, SSS and/or PBCH to detect a cell, synchronize with the cell and perform other initial access procedures. The CP selection circuitry 643 may further be pre-configured, via the cyclic prefix information 618, with respective CP types for other DL and/or UL transmissions, as described in more detail below.

The CP selection circuitry 643 may further be configured to receive cyclic prefix information 618 related to one or more CP types from a scheduling entity via the DL traffic and control channel reception and processing circuitry 642. In some examples, the cyclic prefix information 618 may indicate whether the scheduling entity supports the normal CP and/or the extended CP. In other examples, the cyclic prefix information 618 may further include a respective selected CP type for one or more DL and/or UL transmissions. For example, the cyclic prefix information 618 may include a single CP type for an UL or DL transmission or may include multiple selected CP types, each for a different DL or UL transmission. The cyclic prefix information 618 may further include the numerology (e.g., tone spacing) to use for one or more UL and/or DL transmissions.

The cyclic prefix information 618 may be received within various signals or channels. In some examples, the cyclic prefix information 618 may be received within one or more of a MIB, SIB, RRC configuration message, or DCI. For example, the DCI may include a single bit or multiple bits indicating the CP type for a DL assignment or UL grant. In some examples, the cyclic prefix information 618 may include a single bit or multiple bits transmitted within a random access response message indicating the CP type for an uplink grant. In some examples, the cyclic prefix information 618 may be received within the PSS and/or SSS and include the CP type and tone spacing for a measurement reference signal. Thus, when the scheduled entity 600 receives the PSS/SSS, the scheduled entity may be able to perform measurements in the cell based on the indicated numerology and CP type.

The CP selection circuitry 643 may further select the CP type for an UL and/or DL transmission based on one or more factors or parameters. Examples of factors include, but are not limited to, the cyclic prefix information 618, the type of transmission (e.g., type of signal or channel), location of resource elements utilized for the transmission in a slot/subframe, numerology (e.g., tone spacing) of the transmission, and/or link direction. In some examples, the CP selection circuitry 643 may select a particular CP type for an UL and/or DL transmission based on the cyclic prefix information 618. For example, if the cyclic prefix information 618 indicates that the normal CP should be utilized for a particular UL or DL transmission, the CP selection circuitry 643 may select the normal CP for that UL or DL transmission. As another example, if the cyclic prefix information 618 indicates that the extended CP should be utilized for a particular UL or DL transmission, the CP selection circuitry 643 may select the extended CP for that UL or DL transmission.

The CP selection circuitry 643 may further be pre-configured, via the cyclic prefix information 618, to utilize a particular CP type for other UL or DL transmissions. For example, the CP selection circuitry 643 may be pre-configured, via the cyclic prefix information 618, to utilize the normal CP for the PDCCH, contention-based channels, such as the physical random access channel (PRACH), measurement reference signals (e.g., reference signals used for intra-frequency and inter-frequency measurement), tracking reference signals (e.g., reference signals used for time/frequency tracking), and/or demodulation reference signals. The CP selection circuitry 643 may further be pre-configured, via the cyclic prefix information 618, to utilize the extended CP for zone-specific signals (e.g., zone PBCH and/or zone measurement reference signals) and traffic channels (e.g., PDSCH and/or PUSCH).

The CP selection circuitry 643 may further be pre-configured, via the cyclic prefix information 618, to utilize the normal CP for transmissions within a DL or UL control region and to utilize the extended CP for transmissions within a DL or UL traffic region. In some examples, the CP selection circuitry 643 may be pre-configured, via the cyclic prefix information 618, to utilize the normal CP for measurement/tracking references signals and/or demodulation reference signals transmitted in the control region of the slot, and the extended CP for measurement/tracking reference signals and/or demodulation reference signals transmitted in the traffic region of the slot. In some examples, the CP selection circuitry 643 may be pre-configured, via the cyclic prefix information 618, to utilize the normal CP for measurement/tracking reference signals for at least some slots/subframes. For example, one slot every 40 ms may utilize the normal CP and a reference tone spacing (e.g., 30 kHz) to facilitate measurement.

The CP selection circuitry 643 may further be pre-configured, via the cyclic prefix information 618, to utilize the extended CP when the tone spacing is less than or equal to a tone spacing threshold 619 and may to utilize the normal CP when the tone spacing is greater than the tone spacing threshold 619. In some examples, the tone spacing threshold 619 may be 30 kHz, such that a tone spacing of 15 kHz or 30 kHz may utilize the normal CP, while a tone spacing of 60 kHz or 120 kHz may utilize the extended CP. The tone spacing threshold 619 may be maintained, for example, in memory 605. The CP selection circuitry 643 may further be pre-configured to utilize a particular CP type based on link direction (e.g., DL, UL and/or sidelink), which in some examples, may also be based on one or more other factors.

In some examples, the CP selection circuitry 643 may further be configured to generate and transmit cyclic prefix information 618 to the scheduling entity. The cyclic prefix information 618 may indicate, for example, whether the scheduled entity 600 supports the normal CP and/or the extended CP and/or whether the scheduled entity is pre-configured with a particular CP type (e.g., normal or extended) for one or more DL and/or UL transmissions. The CP selection circuitry 643 may further operate in coordination with CP selection software 653.

Figure 7:
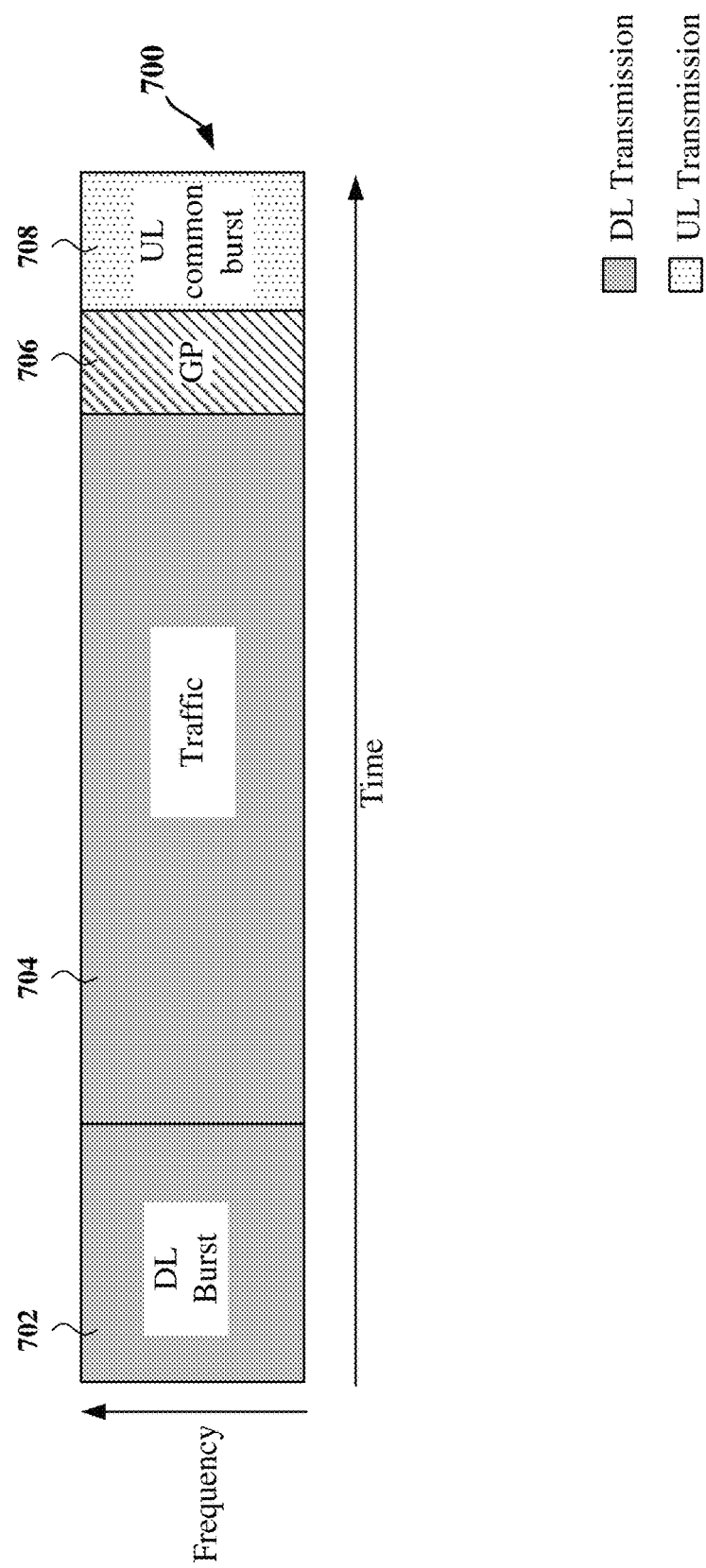
FIG. 7 is a diagram illustrating an example of a slot that may be used in some networks according to some aspects of the disclosure.
Figure 8:
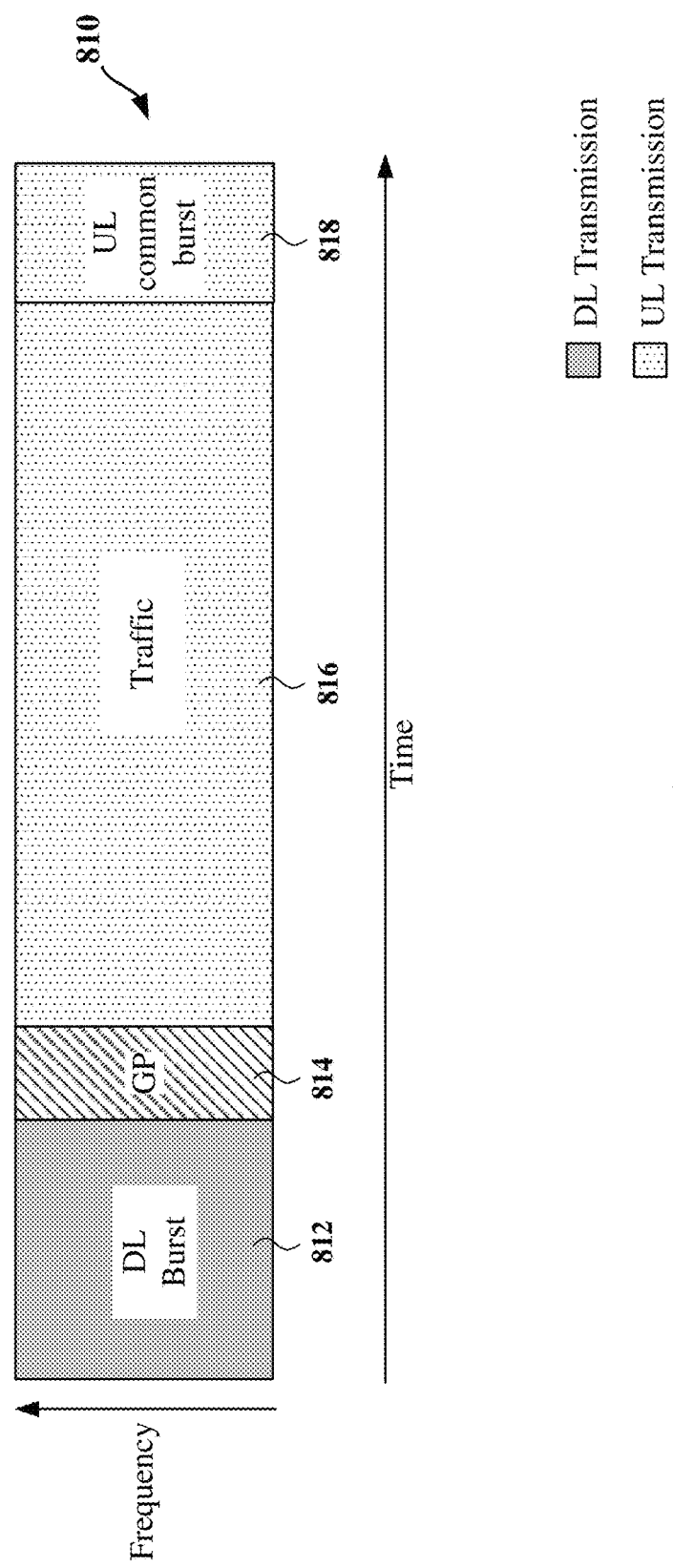
FIG. 8 is a diagram illustrating another example of a slot that may be used in some networks according to some aspects of the disclosure.

FIGS. 7 and 8 illustrate examples of slots 700 and 800 that may be used in some networks. In some examples, each of the slots 700 and 800 shown in FIGS. 7 and 8 is a time division duplexed slot that includes time-frequency resources divided into transmit and receive portions in the time domain. For example, each slot may contain a plurality of consecutive subcarriers in the frequency domain and a plurality of OFDM symbols in the time domain. The number of subcarriers may be determined, for example, by the system bandwidth supported by the network or a device bandwidth supported by a particular scheduled entity. The number of OFDM symbols within each slot may be determined, for example, based on the system requirements in the network and/or the particular slot structure utilized for a current slot. The slots shown in FIGS. 7 and 8 are merely exemplary, and it should be understood that the present disclosure is not limited to the particular slot structures shown in FIGS. 7 and 8. For example, the present disclosure may utilize frequency division duplexed slots instead of time division duplexed slots.

FIG. 7 is a diagram illustrating an example of a downlink (DL)-centric slot 700 according to some aspects of the disclosure. In the example shown in FIG. 7, time is illustrated along a horizontal axis, while frequency is illustrated along a vertical axis. The time-frequency resources of the DL-centric slot 700 may be divided into a DL burst 702, a DL traffic region 704 and an UL burst 708.

The DL burst 702 may exist in the initial or beginning portion of the DL-centric slot. The DL burst 702 may include any suitable DL information in one or more channels. In some examples, the DL burst 702 may include various scheduling information and/or control information corresponding to various portions of the DL-centric slot. In some configurations, the DL burst 702 may be a physical DL control channel (PDCCH). The DL-centric slot may also include a DL traffic region 704. The DL traffic region 704 may sometimes be referred to as the payload of the DL-centric slot. The DL traffic region 704 may include the communication resources utilized to communicate DL user data traffic from the scheduling entity 202 (e.g., gNB) to the scheduled entity 204 (e.g., UE). In some configurations, the DL traffic region 704 may include a physical DL shared channel (PDSCH).

The UL burst 708 may include, for example, uplink control information (UCI) within a PUCCH. In some examples, the UCI may include feedback information corresponding to various other portions of the DL-centric slot. For example, the UCI may include feedback information corresponding to the control region 702 and/or DL traffic region 704. Non-limiting examples of feedback information may include an ACK signal, a NACK signal, a HARQ indicator, and/or various other suitable types of feedback information. The UCI may also include scheduling requests for uplink user data traffic, channel quality information (CQI), multiple-input-multiple-output (MIMO parameters, and various other suitable types of information. The UL burst 706 may further include other types of information in one or more other channels, such as information pertaining to random access channel (RACH) procedures on a physical random access channel (PRACH).

As illustrated in FIG. 7, the end of the DL traffic region 704 may be separated in time from the beginning of the UL burst 708. This time separation may sometimes be referred to as a gap, a guard period, a guard interval, and/or various other suitable terms, hereinafter referred to as a guard period (GP) 706. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

FIG. 8 is a diagram showing an example of an uplink (UL)-centric slot 800 according to some aspects of the disclosure. In the example shown in FIG. 8, time is illustrated along a horizontal axis, while frequency is illustrated along a vertical axis. The time-frequency resources of the UL-centric slot 800 may be divided into a DL burst 802, an UL traffic region 806 and an UL burst 808.

The DL burst 802 may exist in the initial or beginning portion of the UL-centric slot. The DL burst 802 in FIG. 8 may be similar to the DL burst 702 described above with reference to FIG. 7. The UL-centric slot may also include an UL traffic region 806. The UL traffic region 806 may sometimes be referred to as the payload of the UL-centric slot. The UL traffic region 806 may include the communication resources utilized to communicate UL user data traffic from the scheduled entity 204 (e.g., UE) to the scheduling entity 202 (e.g., gNB). In some configurations, the UL traffic region 806 may be a physical UL shared channel (PUSCH). In addition, in some examples, the PUSCH may further carry various UCI, such as feedback information, scheduling requests, or an aperiodic CQI report. The UL burst 808 in FIG. 8 may be similar to the UL burst 708 described above with reference to FIG. 7.

As illustrated in FIG. 8, the end of the DL burst 802 may be separated in time from the beginning of the UL traffic region 806. This time separation may sometimes be referred to as a gap, guard period, guard interval, and/or various other suitable terms, hereinafter referred to as a guard period (GP) 804. This separation provides time for the switch-over from DL communication (e.g., reception operation by the scheduled entity 204 (e.g., UE)) to UL communication (e.g., transmission operation by the scheduled entity 204 (e.g., UE)). One of ordinary skill in the art will understand that the foregoing is merely one example of an UL-centric slot, and alternative structures having similar features may exist without necessarily deviating from the aspects described herein.

In various aspects of the disclosure, a particular CP type may be utilized for one or more of the regions within each slot 700 and 800. In some examples, the normal CP may be utilized for transmissions within the DL control regions 702 or 802 of the DL-centric slot 700 or UL-centric slot 800. In some examples, the normal CP may further be utilized for transmissions within the UL control regions (UL common burst) 708 or 808 of the DL-centric slot 700 or the UL-centric slot 800. In some examples, either the normal CP or the extended CP may be utilized for transmission (e.g., user data traffic or control) within the traffic regions 704 and 806 of the DL-centric slot 700 and the UL-centric slot 800. The CP type (e.g., normal or extended) for the traffic regions 704 and 806 may be pre-configured in the scheduled entity or indicated by the network within the cyclic prefix information transmitted to the scheduled entity.

Figure 9:
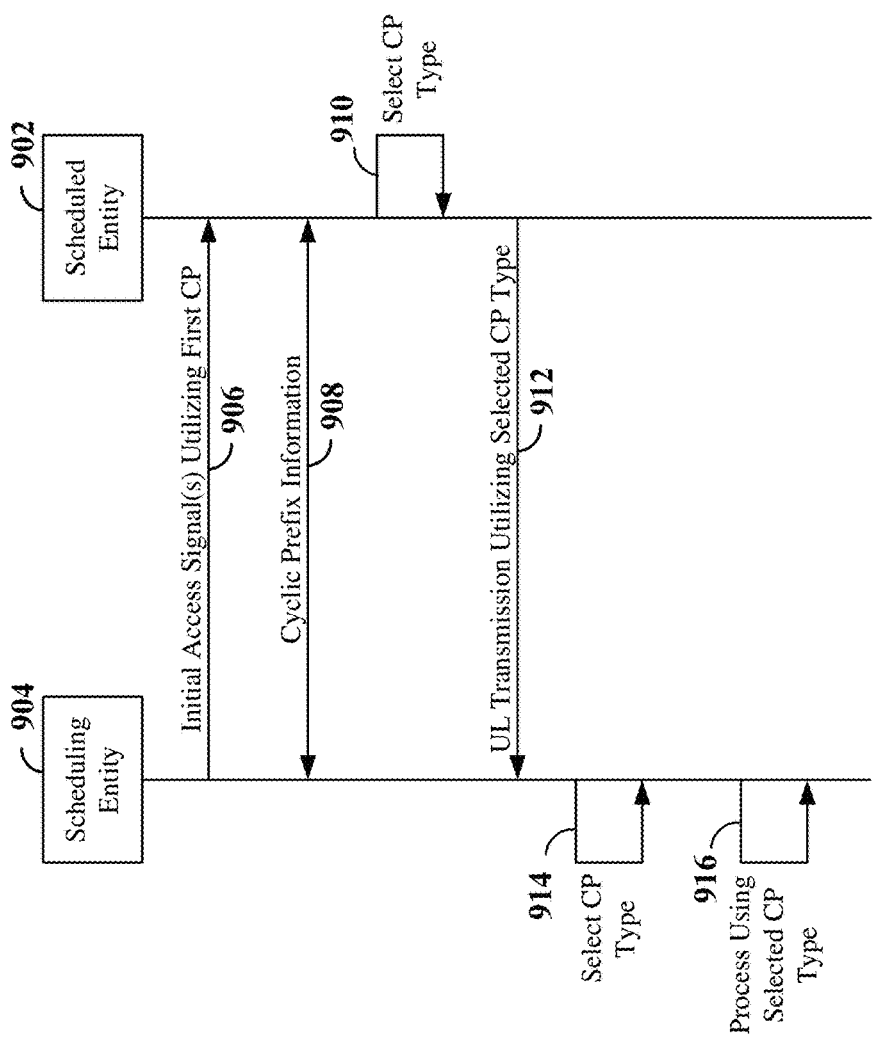
FIG. 9 is a diagram illustrating exemplary signaling between a scheduling entity and a scheduled entity according to some aspects of the disclosure.

FIG. 9 is a signal flow diagram illustrating exemplary signaling between a scheduling entity 904 and a scheduled entity 902 according to some aspects of the disclosure. The scheduling entity 904 may be a base station or user equipment (UE) as illustrated in any one or more of FIGS. 1, 2, and/or 5. The scheduled entity 902 may be a user equipment (UE) as illustrated in any one or more of FIGS. 1, 2, and/or 6.

At 906, the scheduling entity 904 may transmit one or more initial access signals/channels, such as the PSS, SSS, PBCH, and/or any signal/channel including minimum required system information, utilizing a first cyclic prefix (e.g., the normal CP). The initial access signals/channels may enable the scheduled entity 902 to detect the cell served by the scheduling entity 904 and initiate an initial access procedure to establish a connection to the scheduling entity 904. For example, the scheduled entity 902 may generate and transmit a random access channel (RACH) signal in response to receiving the initial access signals/channels.

At 908, the scheduled entity 902 and scheduling entity 904 may share cyclic prefix information therebetween. In some examples, the cyclic prefix information may indicate whether the scheduling entity and/or scheduled entity supports a second cyclic prefix (e.g., the extended CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions.

In some examples, the cyclic prefix information may be transmitted from the scheduled entity 902 to the scheduling entity 904 within a RACH signal or uplink control information (UCI). For example, the RACH signal or UCI may include a single bit or multiple bits indicating the CP type for an UL grant. The RACH signal may further include an indication of whether the scheduled entity supports the second cyclic prefix. In some examples, the UCI may further include one or more pre-configured CP types (e.g., a respective pre-configured CP type for one or more UL and/or DL transmissions).

In some examples, the cyclic prefix information may be transmitted from the scheduling entity 904 to the scheduled entity 902 within one or more of a MIB, SIB, RRC configuration message, or DCI. For example, the DCI may include a single bit or multiple bits indicating the CP type for a DL assignment or UL grant. In some examples, the cyclic prefix information may include a single bit or multiple bits transmitted within a random access response message indicating the CP type for an uplink grant. In some examples, the cyclic prefix information may be received within the PSS and/or SSS and include the CP type and tone spacing for a measurement reference signal.

At 910, the scheduled entity 902 may select a particular cyclic prefix type (e.g., normal, extended, or other) for an uplink transmission in the cell. In some examples, the cyclic prefix type may be determined based on the cyclic prefix information and one or more of a resource location (e.g., location of resource elements allocated to the second transmission), a tone spacing, a link direction, or a transmission type of the uplink transmission.

At 912, the scheduled entity 902 may generate and transmit the uplink transmission with the selected cyclic prefix type. In some examples, the uplink transmission may include the second cyclic prefix (e.g., the extended CP), while in other examples, the uplink transmission may include the first cyclic prefix (e.g., the normal CP).

At 914, the scheduling entity 904 may select the cyclic prefix type (e.g., normal or extended) for the received uplink transmission. In some examples, the cyclic prefix type may be determined based on the cyclic prefix information and one or more of a resource location (e.g., location of resource elements allocated to the second transmission), a tone spacing, a link direction, or a transmission type of the uplink transmission. At 916, the scheduling entity 904 may process the uplink transmission utilizing the selected cyclic prefix type.

Figure 10:
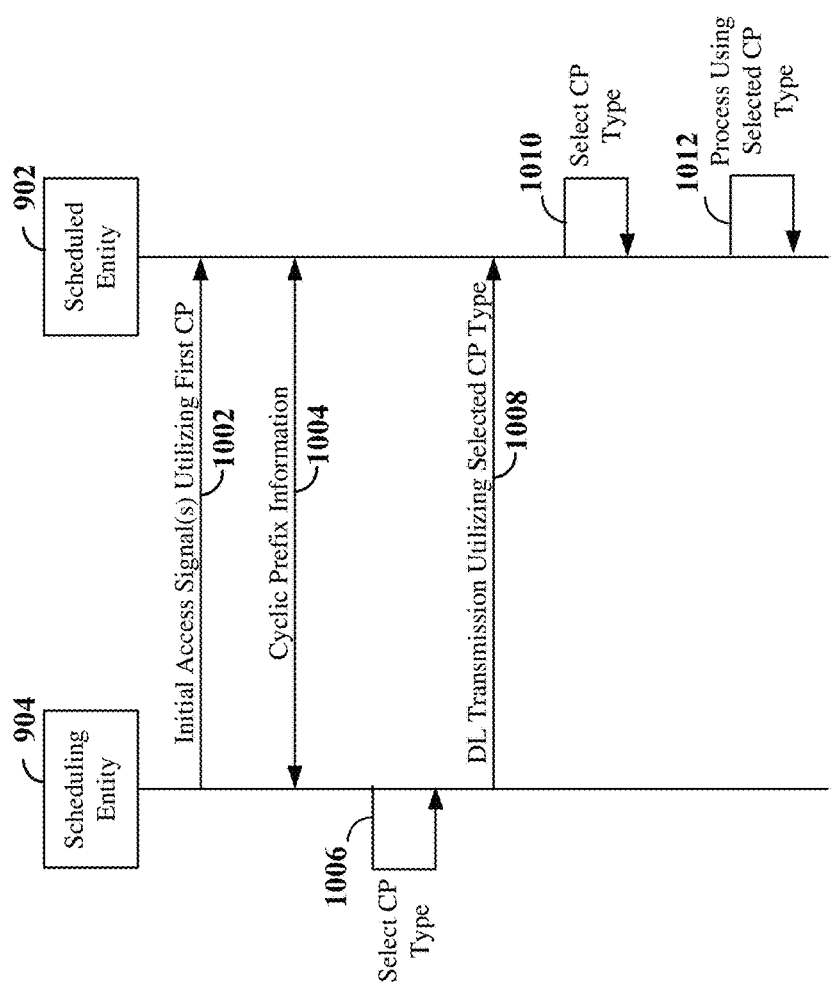
FIG. 10 is a diagram illustrating other exemplary signaling between a scheduling entity and a scheduled entity according to some aspects of the disclosure.

FIG. 10 is a signal flow diagram illustrating other exemplary signaling between a scheduling entity 904 and a scheduled entity 902 according to some aspects of the disclosure. At 1002, the scheduling entity 904 may transmit one or more initial access signals/channels, such as the PSS, SSS, PBCH, and/or any signal/channel including minimum required system information, utilizing a first cyclic prefix (e.g., the normal CP). The initial access signals/channels may enable the scheduled entity 902 to detect the cell served by the scheduling entity 904 and initiate an initial access procedure to establish a connection to the scheduling entity 904. For example, the scheduled entity 902 may generate and transmit a random access channel (RACH) signal in response to receiving the initial access signals/channels.

At 1004, the scheduled entity 902 and scheduling entity 904 may share cyclic prefix information therebetween. In some examples, the cyclic prefix information may indicate whether the scheduling entity and/or scheduled entity supports a second cyclic prefix (e.g., the extended CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions.

In some examples, the cyclic prefix information may be transmitted from the scheduled entity 902 to the scheduling entity 904 within a RACH signal or uplink control information (UCI). For example, the RACH signal or UCI may include a single bit or multiple bits indicating the CP type for an UL grant. The RACH signal may further include an indication of whether the scheduled entity supports the second cyclic prefix. In some examples, the UCI may further include one or more pre-configured CP types (e.g., a respective pre-configured CP type for one or more UL and/or DL transmissions).

In some examples, the cyclic prefix information may be transmitted from the scheduling entity 904 to the scheduled entity 902 within one or more of a MIB, SIB, RRC configuration message, or DCI. For example, the DCI may include a single bit or multiple bits indicating the CP type for a DL assignment or UL grant. In some examples, the cyclic prefix information may include a single bit or multiple bits transmitted within a random access response message indicating the CP type for an uplink grant. In some examples, the cyclic prefix information may be received within the PSS and/or SSS and include the CP type and tone spacing for a measurement reference signal.

At 1006, the scheduling entity 904 may select a particular cyclic prefix type (e.g., normal or extended) for a downlink transmission in the cell. In some examples, the cyclic prefix type may be determined based on the cyclic prefix information and one or more of a resource location (e.g., location of resource elements allocated to the second transmission), a tone spacing, a link direction, or a transmission type of the uplink transmission.

At 1008, the scheduling entity 904 may generate and transmit the downlink transmission with the selected cyclic prefix type. In some examples, the downlink transmission may include the second cyclic prefix (e.g., the extended CP), while in other examples, the downlink transmission may include the first cyclic prefix (e.g., the normal CP).

At 1010, the scheduled entity 902 may select the cyclic prefix type (e.g., normal or extended) for the received downlink transmission. In some examples, the cyclic prefix type may be determined based on the cyclic prefix information and one or more of a resource location (e.g., location of resource elements allocated to the second transmission), a tone spacing, a link direction, or a transmission type of the downlink transmission. At 1012, the scheduled entity 902 may process the downlink transmission utilizing the selected cyclic prefix type.

Figure 11:
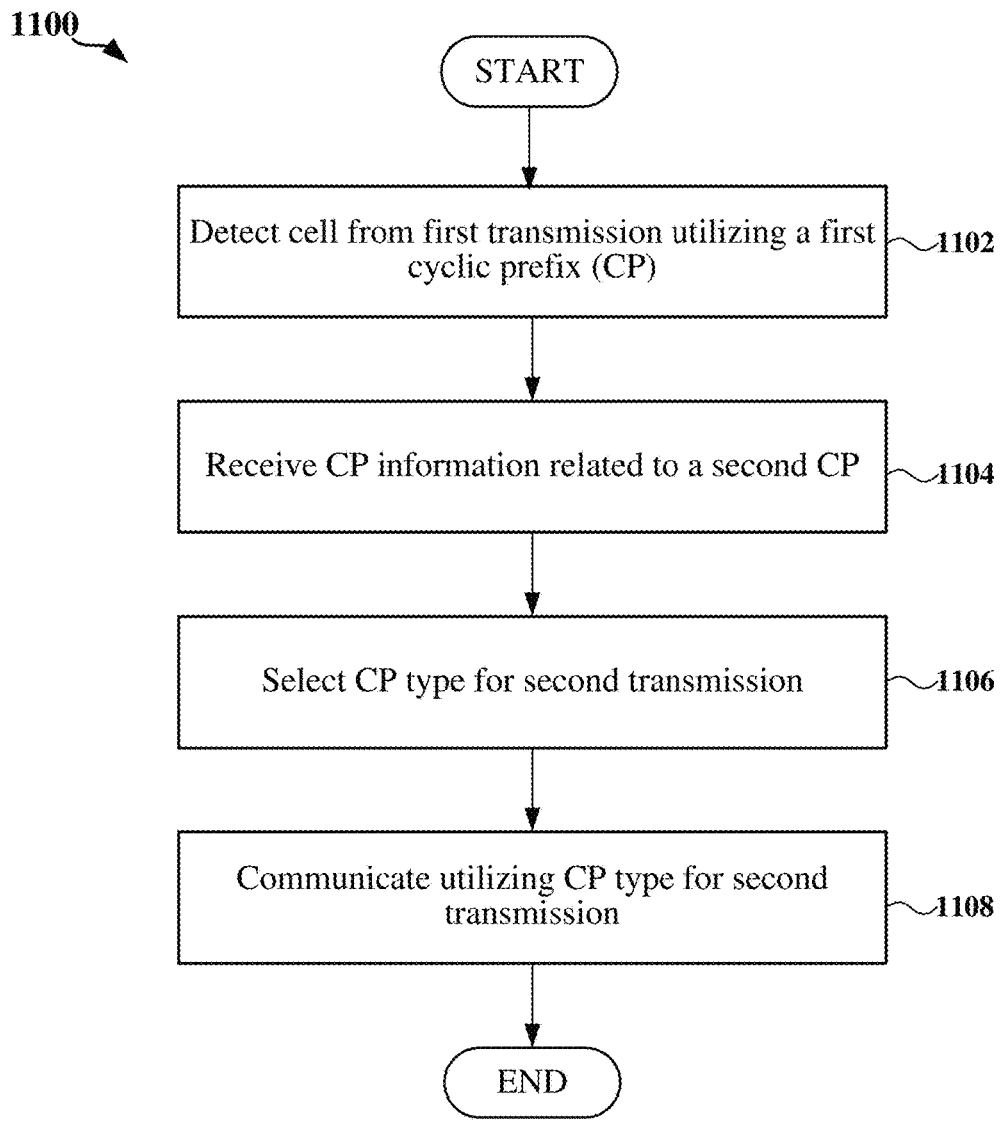
FIG. 11 is a flow chart illustrating an exemplary process for wireless communication utilizing different CPs according to some aspects of the disclosure.

FIG. 11 is a flow chart illustrating a process 1100 for wireless communication utilizing different cyclic prefixes (CPs) according to an aspect of the disclosure. As described below, some or all illustrated features may be omitted in a particular implementation within the scope of the present disclosure, and some illustrated features may not be required for implementation of all embodiments. In some examples, the process 1100 may be carried out by the scheduled entity illustrated in FIG. 6. In some examples, the process 1100 may be carried out by any suitable apparatus or means for carrying out the functions or algorithm described below.

At block 1102, the scheduled entity may detect a cell from a first transmission utilizing a first cyclic prefix. In some examples, the scheduled entity may utilize the normal CP to receive and process one or more initial access signals/channels, such as the PSS, SSS, PBCH, and/or any signal/channel including minimum required system information, to enable the scheduled entity to detect the cell. In some examples, the normal CP may be pre-configured in the scheduled entity for these initial access signals/channels. For example, the CP selection circuitry 643 and DL traffic and control channel reception and processing circuitry 642 shown and described above in connection with FIG. 6 may detect the cell from at least one initial access channel/signal utilizing the normal CP.

At block 1104, the scheduled entity may receive cyclic prefix information related to a second cyclic prefix from a scheduling entity. In some examples, the cyclic prefix information may indicate whether the scheduling entity supports the second cyclic prefix (e.g., the extended CP and/or other CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions. For example, the CP selection circuitry 643 and DL traffic and control channel reception and processing circuitry 642 shown and described above in connection with FIG. 6 may receive the cyclic prefix information from the scheduling entity.

At block 1106, the scheduled entity may select a cyclic prefix type (e.g., normal, extended, or other) for a second transmission in the cell. In some examples, the cyclic prefix type may be determined based on the cyclic prefix information and one or more of a resource location (e.g., location of resource elements allocated to the second transmission), a tone spacing, a link direction, or a transmission type of the second transmission. For example, the CP selection circuitry 643 shown and described above in connection with FIG. 6 may select the cyclic prefix type for the second transmission.

At block 1108, the scheduled entity may communicate with the cell utilizing the cyclic prefix type for the second transmission. For example, the CP selection circuitry 643 shown and described above in connection with FIG. 6 may provide the CP type to the DL traffic and control channel reception and processing circuitry 642 or the UL traffic and control channel generation and transmission circuitry 641 also shown and described above in connection with FIG. 6 to communicate with the cell utilizing the CP type for the second transmission.

Figure 12:
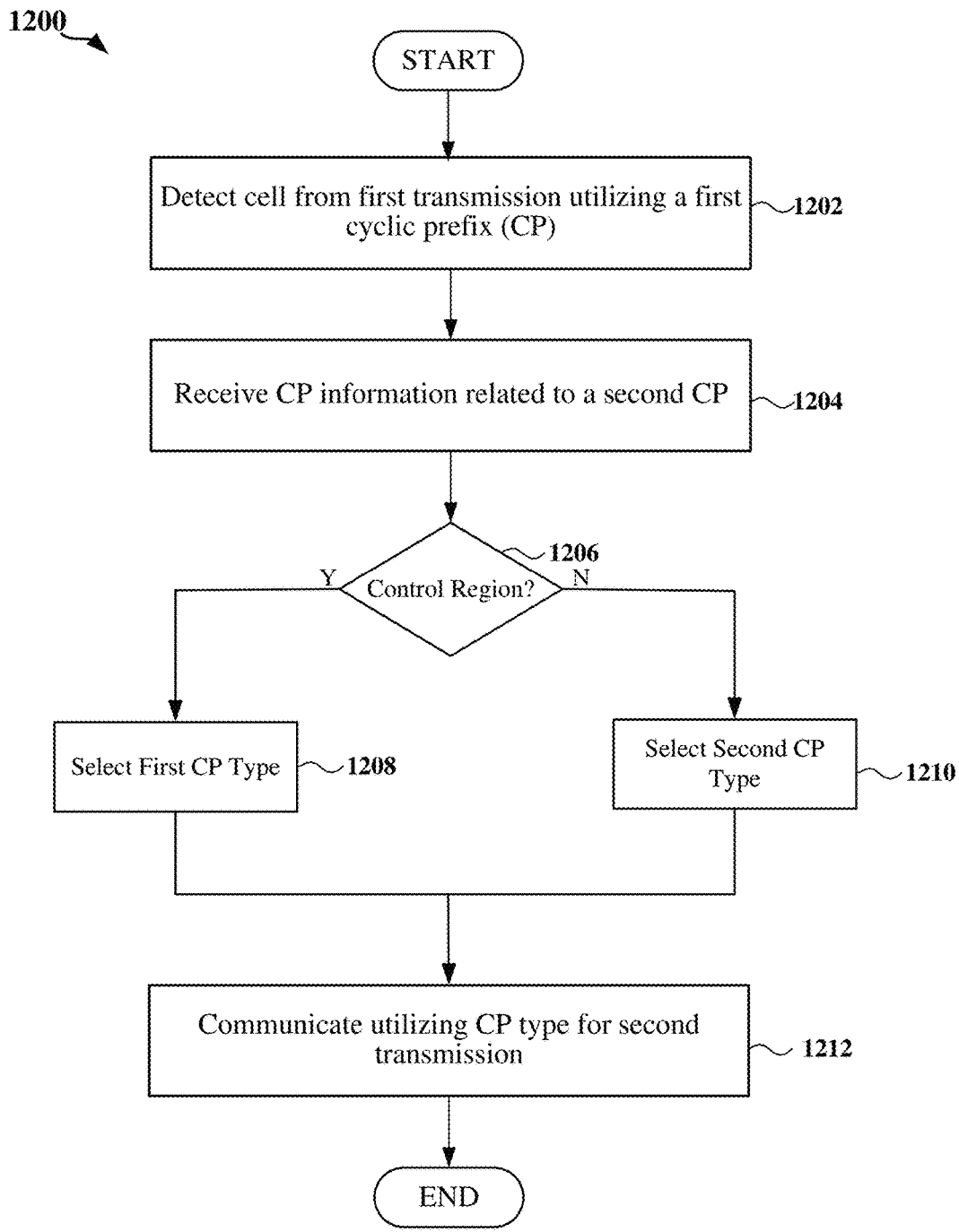
FIG. 12 is a flow chart illustrating another exemplary process for wireless communication utilizing different CPs according to some aspects of the disclosure.

FIG. 12 is a flow chart illustrating a process 1200 for wireless communication utilizing different cyclic prefixes (CPs) according to an aspect of the disclosure. As described below, some or all illustrated features may be omitted in a particular implementation within the scope of the present disclosure, and some illustrated features may not be required for implementation of all embodiments. In some examples, the process 1200 may be carried out by the scheduled entity illustrated in FIG. 6. In some examples, the process 1200 may be carried out by any suitable apparatus or means for carrying out the functions or algorithm described below.

At block 1202, the scheduled entity may detect a cell from a first transmission utilizing a first cyclic prefix. In some examples, the scheduled entity may utilize the normal CP to receive and process one or more initial access signals/channels, such as the PSS, SSS, PBCH, and/or any signal/channel including minimum required system information, to enable the scheduled entity to detect the cell. In some examples, the normal CP may be pre-configured in the scheduled entity for these initial access signals/channels. For example, the CP selection circuitry 643 and DL traffic and control channel reception and processing circuitry 642 shown and described above in connection with FIG. 6 may detect the cell from at least one initial access channel/signal utilizing the normal CP.

At block 1204, the scheduled entity may receive cyclic prefix information related to a second cyclic prefix from a scheduling entity. In some examples, the cyclic prefix information may indicate whether the scheduling entity supports the second cyclic prefix (e.g., the extended CP and/or other CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions. For example, the CP selection circuitry 643 and DL traffic and control channel reception and processing circuitry 642 shown and described above in connection with FIG. 6 may receive the cyclic prefix information from the scheduling entity.

At block 1206, the scheduled entity may determine whether a second transmission is to be transmitted within a control region of a slot. For example, the scheduled entity may determine whether the second transmission is to be transmitted within a downlink burst or uplink burst of a downlink-centric slot or an uplink-centric slot. For example, the CP selection circuitry 643 shown and described above in connection with FIG. 6 may determine whether the second transmission is to be transmitted within a control region of a slot.

If the second transmission is to be transmitted within a control region of a slot (Y branch of block 1206), at block 1208, the scheduled entity may select a first cyclic prefix type (e.g., normal CP) for the second transmission. However, if the second transmission is not to be transmitted within a control region of a slot (N branch of block 1206), at block 1210, the scheduled entity may select a second cyclic prefix type (e.g., extended CP or other CP) for the second transmission. For example, the scheduled entity may select the second cyclic prefix type when the second transmission is to be transmitted within a traffic region of a slot. For example, the CP selection circuitry 643 shown and described above in connection with FIG. 6 may select the cyclic prefix type for the second transmission.

At block 1212, the scheduled entity may communicate with the cell utilizing the selected cyclic prefix type for the second transmission. For example, the CP selection circuitry 643 shown and described above in connection with FIG. 6 may provide the selected CP type to the DL traffic and control channel reception and processing circuitry 642 or the UL traffic and control channel generation and transmission circuitry 641 also shown and described above in connection with FIG. 6 to communicate with the cell utilizing the CP type selected for the second transmission.

Figure 13:
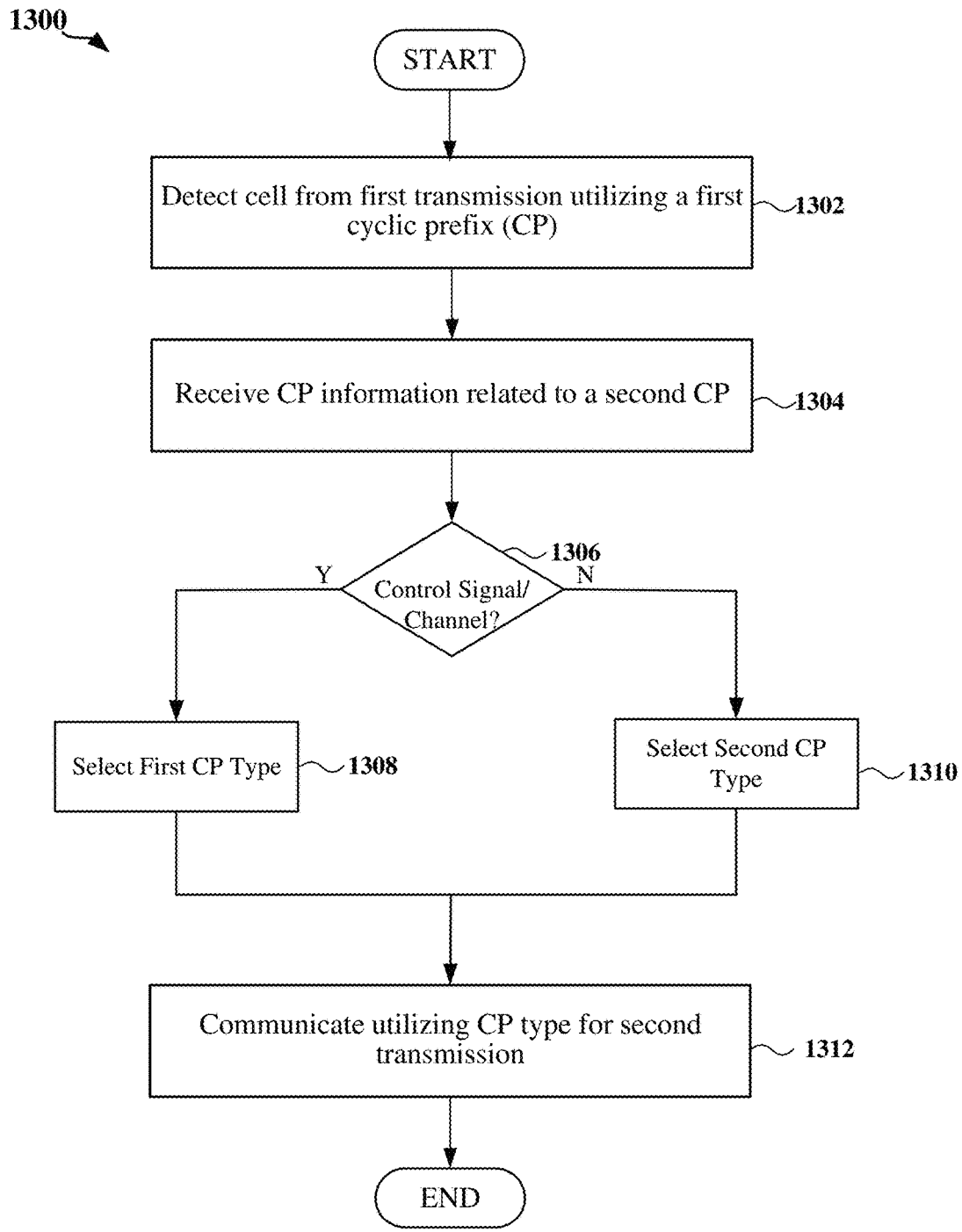
FIG. 13 is a flow chart illustrating another exemplary process for wireless communication utilizing different CPs according to some aspects of the disclosure.

FIG. 13 is a flow chart illustrating a process 1300 for wireless communication utilizing different cyclic prefixes (CPs) according to an aspect of the disclosure. As described below, some or all illustrated features may be omitted in a particular implementation within the scope of the present disclosure, and some illustrated features may not be required for implementation of all embodiments. In some examples, the process 1300 may be carried out by the scheduled entity illustrated in FIG. 6. In some examples, the process 1300 may be carried out by any suitable apparatus or means for carrying out the functions or algorithm described below.

At block 1302, the scheduled entity may detect a cell from a first transmission utilizing a first cyclic prefix. In some examples, the scheduled entity may utilize the normal CP to receive and process one or more initial access signals/channels, such as the PSS, SSS, PBCH, and/or any signal/channel including minimum required system information, to enable the scheduled entity to detect the cell. In some examples, the normal CP may be pre-configured in the scheduled entity for these initial access signals/channels. For example, the CP selection circuitry 643 and DL traffic and control channel reception and processing circuitry 642 shown and described above in connection with FIG. 6 may detect the cell from at least one initial access channel/signal utilizing the normal CP.

At block 1304, the scheduled entity may receive cyclic prefix information related to a second cyclic prefix from a scheduling entity. In some examples, the cyclic prefix information may indicate whether the scheduling entity supports the second cyclic prefix (e.g., the extended CP and/or other CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions. For example, the CP selection circuitry 643 and DL traffic and control channel reception and processing circuitry 642 shown and described above in connection with FIG. 6 may receive the cyclic prefix information from the scheduling entity.

At block 1306, the scheduled entity may determine whether a second transmission includes a control channel or a control signal. For example, the scheduled entity may determine whether the second transmission includes an UL or DL broadcast or common control signal or channel or a unicast control channel/signal. For example, the CP selection circuitry 643 shown and described above in connection with FIG. 6 may determine whether the second transmission includes a control channel or a control signal.

If the second transmission includes a control channel or a control signal (Y branch of block 1306), at block 1308, the scheduled entity may select a first cyclic prefix type (e.g., normal CP) for the second transmission. However, if the second transmission does not include a control channel or a control signal (N branch of block 1306), at block 1310, the scheduled entity may select a second cyclic prefix type (e.g., extended CP or other CP) for the second transmission. For example, the scheduled entity may select the second cyclic prefix type when the second transmission includes a traffic channel (e.g., PDSCH or PUSCH). For example, the CP selection circuitry 643 shown and described above in connection with FIG. 6 may select the cyclic prefix type for the second transmission.

At block 1312, the scheduled entity may communicate with the cell utilizing the selected cyclic prefix type for the second transmission. For example, the CP selection circuitry 643 shown and described above in connection with FIG. 6 may provide the selected CP type to the DL traffic and control channel reception and processing circuitry 642 or the UL traffic and control channel generation and transmission circuitry 641 also shown and described above in connection with FIG. 6 to communicate with the cell utilizing the CP type selected for the second transmission.

Figure 14:
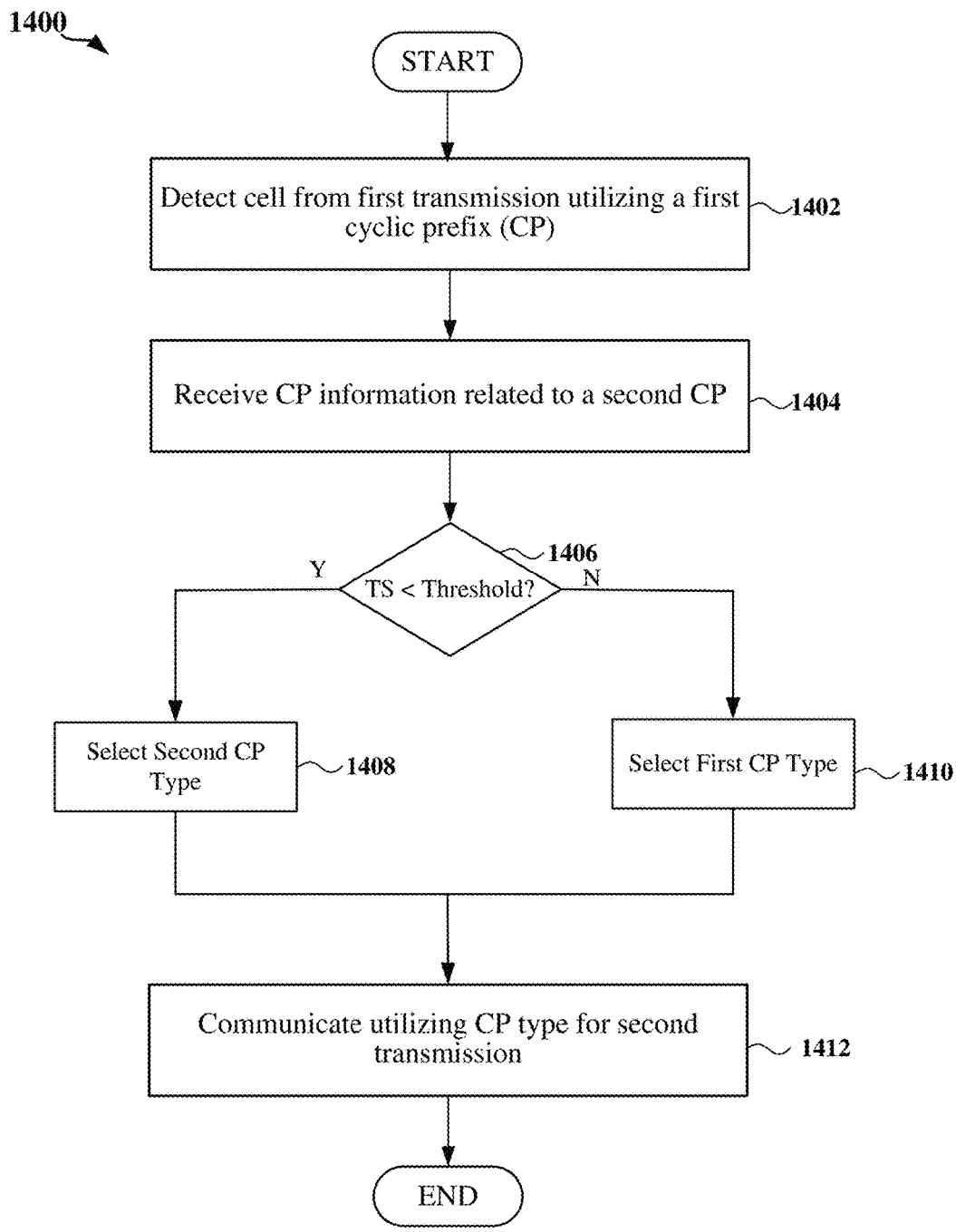
FIG. 14 is a flow chart illustrating another exemplary process for wireless communication utilizing different CPs according to some aspects of the disclosure.

FIG. 14 is a flow chart illustrating a process 1400 for wireless communication utilizing different cyclic prefixes (CPs) according to an aspect of the disclosure. As described below, some or all illustrated features may be omitted in a particular implementation within the scope of the present disclosure, and some illustrated features may not be required for implementation of all embodiments. In some examples, the process 1400 may be carried out by the scheduled entity illustrated in FIG. 6. In some examples, the process 1400 may be carried out by any suitable apparatus or means for carrying out the functions or algorithm described below.

At block 1402, the scheduled entity may detect a cell from a first transmission utilizing a first cyclic prefix. In some examples, the scheduled entity may utilize the normal CP to receive and process one or more initial access signals/channels, such as the PSS, SSS, PBCH, and/or any signal/channel including minimum required system information, to enable the scheduled entity to detect the cell. In some examples, the normal CP may be pre-configured in the scheduled entity for these initial access signals/channels. For example, the CP selection circuitry 643 and DL traffic and control channel reception and processing circuitry 642 shown and described above in connection with FIG. 6 may detect the cell from at least one initial access channel/signal utilizing the normal CP.

At block 1404, the scheduled entity may receive cyclic prefix information related to a second cyclic prefix from a scheduling entity. In some examples, the cyclic prefix information may indicate whether the scheduling entity supports the second cyclic prefix (e.g., the extended CP and/or other CP). In other examples, the cyclic prefix information may further include a respective selected CP type for one or more DL and/or UL transmissions. For example, the cyclic prefix information may include a single CP type for an UL or DL transmission or may include multiple selected CP types, each for a different DL or UL transmission. The cyclic prefix information may further include the numerology (e.g., tone spacing) to use for one or more UL and/or DL transmissions. For example, the CP selection circuitry 643 and DL traffic and control channel reception and processing circuitry 642 shown and described above in connection with FIG. 6 may receive the cyclic prefix information from the scheduling entity.

At block 1406, the scheduled entity may determine whether the tone spacing for a second transmission is less than or equal to a tone spacing threshold. In some examples, the tone spacing threshold may be 30 kHz, such that a tone spacing of 15 kHz or 30 kHz may utilize the normal CP, while a tone spacing of 60 kHz or 120 kHz may utilize the extended CP. For example, the CP selection circuitry 643 shown and described above in connection with FIG. 6 may determine whether the second transmission includes a control channel or a control signal.

If the tone spacing is less than or equal to the tone spacing threshold (Y branch of block 1406), at block 1408, the scheduled entity may select a second cyclic prefix type (e.g., extended CP or other CP) for the second transmission. However, if the tone spacing threshold is greater than the tone spacing threshold (N branch of block 1406), at block 1410, the scheduled entity may select a first cyclic prefix type (e.g., normal CP) for the second transmission. For example, the CP selection circuitry 643 shown and described above in connection with FIG. 6 may select the cyclic prefix type for the second transmission.

At block 1412, the scheduled entity may communicate with the cell utilizing the selected cyclic prefix type for the second transmission. For example, the CP selection circuitry 643 shown and described above in connection with FIG. 6 may provide the selected CP type to the DL traffic and control channel reception and processing circuitry 642 or the UL traffic and control channel generation and transmission circuitry 641 also shown and described above in connection with FIG. 6 to communicate with the cell utilizing the CP type selected for the second transmission.

In one configuration, a scheduled entity apparatus within a wireless communication network includes means for detecting a cell from a first transmission utilizing a first cyclic prefix and means for receiving cyclic prefix information related to a second cyclic prefix. The scheduled entity apparatus further includes means for selecting a cyclic prefix type for a second transmission in the cell based on the cyclic prefix information and at least one of a resource location, a tone spacing, or a transmission type of the second transmission, where the transmission type includes a channel type or signal type of the second transmission and the cyclic prefix type includes the first cyclic prefix or the second cyclic prefix. The scheduled entity apparatus further includes means for communicating with the cell utilizing the cyclic prefix type for the second transmission, where each of the first transmission and the second transmission includes one or more channels or signals.

In one aspect, the aforementioned means for detecting the cell from the first transmission utilizing a first cyclic prefix, and receiving the cyclic prefix information related to a second cyclic prefix may be the transceiver 610 and the processor(s) 604 shown in FIG. 6 configured to perform the functions recited by the aforementioned means. For example, the aforementioned means for detecting the cell and receiving the cyclic prefix information may include the transceiver 610, the DL traffic and control channel reception and processing circuitry 642 and cyclic prefix selection circuitry 643 shown in FIG. 6. In another aspect, the aforementioned means for selecting the cyclic prefix type for the second transmission may be the processor(s) 604 shown in FIG. 6 configured to perform the functions recited by the aforementioned means. For example, the aforementioned means for selecting the cyclic prefix type may include the cyclic prefix selection circuitry 643 shown in FIG. 6. In another aspect, the aforementioned means for communicating with the cell utilizing the cyclic prefix type for the second transmission may be the transceiver 610 and the processor(s) 604 shown in FIG. 6 configured to perform the functions recited by the aforementioned means. For example, the aforementioned means for communicating may include the transceiver 610 and the cyclic prefix selection circuitry 643, together with either the UL traffic and control channel generation and transmission circuitry 641 or the DL traffic and control channel reception and processing circuitry 642, shown in FIG. 6. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 6, 9, and 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   detecting a cell from a first transmission utilizing a first cyclic prefix;
   receiving cyclic prefix information related to a second cyclic prefix;
   selecting a cyclic prefix type for a second transmission in the cell based on the cyclic prefix information and at least one of a resource location, a tone spacing, or a transmission type of the second transmission, wherein the transmission type comprises a channel type or a signal type of the second transmission, wherein the cyclic prefix type comprises the first cyclic prefix or the second cyclic prefix; and
   communicating with the cell utilizing the cyclic prefix type for the second transmission;
   wherein each of the first transmission and the second transmission comprises one or more channels or signals.

2. The method of claim 1, wherein the cyclic prefix type comprises the second cyclic prefix when the cyclic prefix information indicates the second cyclic prefix should be utilized for the second transmission.

3. The method of claim 1, wherein the first cyclic prefix comprises a normal cyclic prefix and the second cyclic prefix comprises an extended cyclic prefix.

4. The method of claim 1, wherein the first transmission comprises at least one of a primary synchronization signal, a secondary synchronization signal, a physical broadcast control channel, or other signal comprising minimum required system information.

5. The method of claim 1, wherein receiving the cyclic prefix information further comprises:
   receiving the cyclic prefix information via one or more of a master information block, a system information block, a radio resource control configuration message, or downlink control information.

6. The method of claim 1, wherein selecting the cyclic prefix type for the second transmission further comprises:
   selecting the first cyclic prefix when the second transmission comprises either a downlink control region of a slot or an uplink control region of the slot.

7. The method of claim 6, wherein selecting the cyclic prefix type for the second transmission further comprises:
   selecting the second cyclic prefix when the second transmission comprises a traffic region of the slot, wherein the traffic region carries user data traffic.

8. The method of claim 1, wherein selecting the cyclic prefix type for the second transmission further comprises:
   selecting the first cyclic prefix when the second transmission is within a first set of slots; and
   selecting the first cyclic prefix or the second cyclic prefix when the second transmission is within a second set of slots.

9. The method of claim 1, wherein selecting the cyclic prefix type for the second transmission further comprises:
   selecting the first cyclic prefix when the second transmission is transmitted over a first set of frequency resources; and
   selecting the first cyclic prefix or the second cyclic prefix when the second transmission is transmitted over a second set of frequency resources.

10. The method of claim 1, wherein selecting the cyclic prefix type for the second transmission further comprises:
    selecting the first cyclic prefix when the second transmission comprises a control channel or control signal; and
    selecting the second cyclic prefix when the second transmission comprises a traffic channel carrying user data traffic.

11. The method of claim 1, wherein selecting the cyclic prefix type for the second transmission further comprises:
    selecting the first cyclic prefix when the second transmission comprises cell-specific signals; and
    selecting the second cyclic prefix when the second transmission comprises zone-specific signals.

12. The method of claim 1, wherein selecting the cyclic prefix type for the second transmission further comprises:
selecting the first cyclic prefix when the second transmission comprises a measurement reference signal.

13. The method of claim 1, wherein selecting the cyclic prefix type for the second transmission further comprises:
selecting the first cyclic prefix when the second transmission comprises a broadcast channel or broadcast signal.

14. The method of claim 1, wherein selecting the cyclic prefix type for the second transmission further comprises:
selecting the first cyclic prefix when the second transmission comprises a first tone spacing; and
selecting the first cyclic prefix or the second cyclic prefix when the second transmission comprises a second tone spacing.

15. The method of claim 14, wherein:
the cyclic prefix type comprises the first cyclic prefix when the first tone spacing is less than or equal to a tone spacing threshold;
the cyclic prefix type comprises the second cyclic prefix when the second tone spacing is greater than the tone spacing threshold; and
the first tone spacing and the second tone spacing are selected from at least three tone spacings.

16. The method of claim 1, wherein selecting the cyclic prefix type for the second transmission further comprises:
selecting the first cyclic prefix when the second transmission comprises a demodulation reference signal within a control region of a slot.

17. The method of claim 1, wherein selecting the cyclic prefix type for the second transmission further comprises:
selecting the first cyclic prefix or the second cyclic prefix when the second transmission comprises a demodulation reference signal within a traffic region of a slot, wherein the traffic region carries user data traffic.

18. The method of claim 1, wherein selecting the cyclic prefix type for the second transmission further comprises:
selecting the cyclic prefix type for the second transmission further based on a link direction, wherein the link direction comprises one of an uplink, a downlink, or a sidelink.

19. A scheduled entity within a wireless communication network, comprising:
a processor;
a memory communicatively coupled to the processor; and
a transceiver communicatively coupled to the processor, wherein the processor is configured to:
detect a cell from a first transmission utilizing a first cyclic prefix;
receive cyclic prefix information related to a second cyclic prefix;
select a cyclic prefix type for a second transmission in the cell based on the cyclic prefix information and at least one of a resource location, a tone spacing, or a transmission type of the second transmission, wherein the transmission type comprises a channel type or a signal type of the second transmission, wherein the cyclic prefix type comprises the first cyclic prefix or the second cyclic prefix; and
communicate with the cell utilizing the cyclic prefix type for the second transmission;
wherein each of the first transmission and the second transmission comprises one or more channels or signals.

20. The scheduled entity of claim 19, wherein the cyclic prefix type comprises the second cyclic prefix when the cyclic prefix information indicates the second cyclic prefix should be utilized for the second transmission.

21. The scheduled entity of claim 19, wherein the first cyclic prefix comprises a normal cyclic prefix and the second cyclic prefix comprises an extended cyclic prefix.

22. The scheduled entity of claim 19, wherein the first transmission comprises at least one of a primary synchronization signal, a secondary synchronization signal, a physical broadcast control channel, or other signal comprising minimum required system information.

23. The scheduled entity of claim 19, wherein the processor is further configured to:
select the first cyclic prefix when the second transmission comprises either a downlink control region of a slot or an uplink control region of the slot; and
select the second cyclic prefix when the second transmission comprises a traffic region of the slot, wherein the traffic region carries user data traffic.

24. The scheduled entity of claim 19, wherein the processor is further configured to:
select the first cyclic prefix when the second transmission comprises a control channel or control signal; and
select the second cyclic prefix when the second transmission comprises a traffic channel carrying user data traffic.

25. The scheduled entity of claim 19, wherein the processor is further configured to:
select the first cyclic prefix when the second transmission comprises cell-specific signals; and
select the second cyclic prefix when the second transmission comprises zone-specific signals.

26. The scheduled entity of claim 19, wherein the processor is further configured to:
select the first cyclic prefix when the second transmission comprises a first tone spacing; and
select the first cyclic prefix or the second cyclic prefix when the second transmission comprises a second tone spacing.

27. A scheduled entity apparatus within a wireless communication network, comprising:
means for detecting a cell from a first transmission utilizing a first cyclic prefix;
means for receiving cyclic prefix information related to a second cyclic prefix;
means for selecting a cyclic prefix type for a second transmission in the cell based on the cyclic prefix information and at least one of a resource location, a tone spacing, or a transmission type of the second transmission, wherein the transmission type comprises a channel type or signal type of the second transmission, wherein the cyclic prefix type comprises the first cyclic prefix or the second cyclic prefix; and
means for communicating with the cell utilizing the cyclic prefix type for the second transmission;
wherein each of the first transmission and the second transmission comprises one or more channels or signals.

28. The scheduled entity apparatus of claim 27, wherein the means for selecting the cyclic prefix type for the second transmission further comprises:
means for selecting the first cyclic prefix when the second transmission comprises either a downlink control region of a slot or an uplink control region of the slot; and
means for selecting the second cyclic prefix when the second transmission comprises a traffic region of the slot, wherein the traffic region carries user data traffic.

29. The scheduled entity apparatus of claim 27, wherein the means for selecting the cyclic prefix type for the second transmission further comprises:
- means for selecting the first cyclic prefix when the second transmission comprises a control channel or control signal; and
- means for selecting the second cyclic prefix when the second transmission comprises a traffic channel carrying user data traffic.

30. The scheduled entity apparatus of claim 27, wherein the means for selecting the cyclic prefix type for the second transmission further comprises:
- means for selecting the first cyclic prefix when the second transmission comprises a first tone spacing; and
- means for selecting the first cyclic prefix or the second cyclic prefix when the second transmission comprises a second tone spacing.

* * * * *